United States Patent [19]

Maeda

[11] Patent Number: 5,745,607
[45] Date of Patent: Apr. 28, 1998

[54] IMAGE ENCODING APPARATUS AND METHOD FOR GENERATING AND ENCODING REDUCED IMAGE DATA BY BIT PLANES

[75] Inventor: Mitsuru Maeda, Yokohama, Japan

[73] Assignee: Canon Kabushiki Kaisha, Tokyo, Japan

[21] Appl. No.: 781,063

[22] Filed: Jan. 9, 1997

Related U.S. Application Data

[63] Continuation of Ser. No. 348,942, Nov. 25, 1994, abandoned.

[30] Foreign Application Priority Data

Dec. 1, 1993 [JP] Japan .................................. 5-301654

[51] Int. Cl.⁶ .................................................. H04N 1/417
[52] U.S. Cl. .................... 382/240; 358/261.2; 358/539
[58] Field of Search ............................. 358/539, 538, 358/426, 261.2, 430; 348/398–400, 408; 382/166, 238–240; 395/160; H04N 1/417, 1/419, 1/415

[56] References Cited

U.S. PATENT DOCUMENTS

| | | | |
|---|---|---|---|
| 5,185,813 | 2/1993 | Tsujimoto | 382/240 |
| 5,317,428 | 5/1994 | Osawa et al. | 358/539 |
| 5,335,088 | 8/1994 | Fan | 382/240 |
| 5,361,147 | 11/1994 | Katayama et al. | 358/539 |
| 5,636,033 | 6/1997 | Maeda | 382/240 |

OTHER PUBLICATIONS

"Binary Image Hierarchical Encoding System—JBIG Algorithm" Gazo Denshi Gakkaishi. vol. 20, No. 1.

*Primary Examiner*—Kim Vu
*Attorney, Agent, or Firm*—Fitzpatrick, Cella, Harper & Scinto

[57] ABSTRACT

Binary color image data outputted by a color scanner is stored in three buffers for respective ones of the color components red, blue and green. First the red data in one buffer is selected by a selector and stored in a first frame memory, then the other two buffers are selected one after the other to store the blue data in the first frame memory after the red data and the green data after the blue data. The image data thus constructed in the first frame memory is copied to a second frame memory, after which hierarchical encoding is performed by the second frame memory and a third frame memory and an encoder. When the encoding is concluded, code that has been stored in a code buffer is stored in a storage device following a header, which has been generated by a header processor, and image attribute information. Accordingly, control of the coder at the time of hierarchical encoding is facilitated and an image conforming to the attributes of the original image can be reproduced.

26 Claims, 23 Drawing Sheets

FIG. 2
(PRIOR ART)
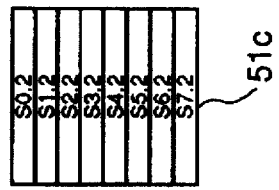
2nd LAYER
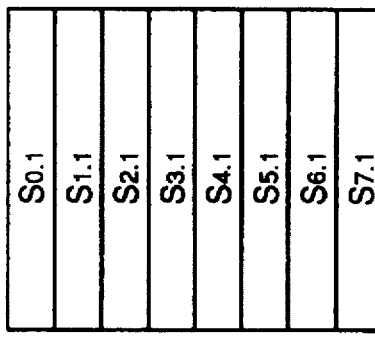
1st LAYER
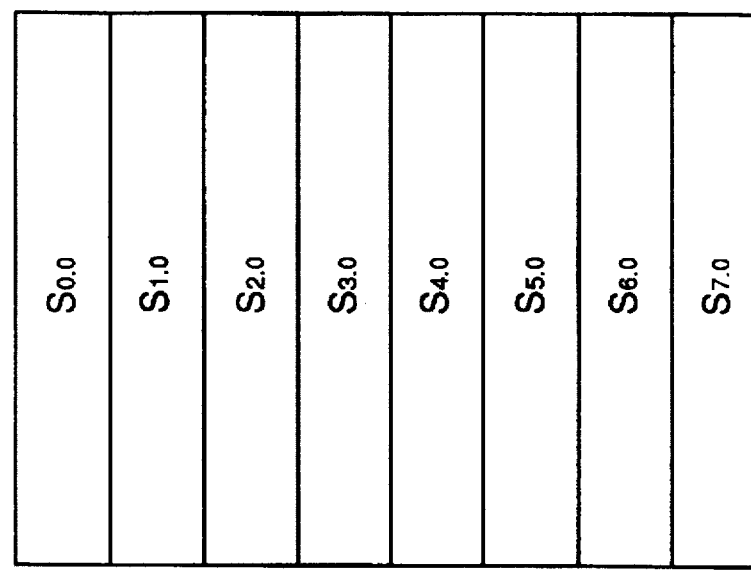
0th LAYER

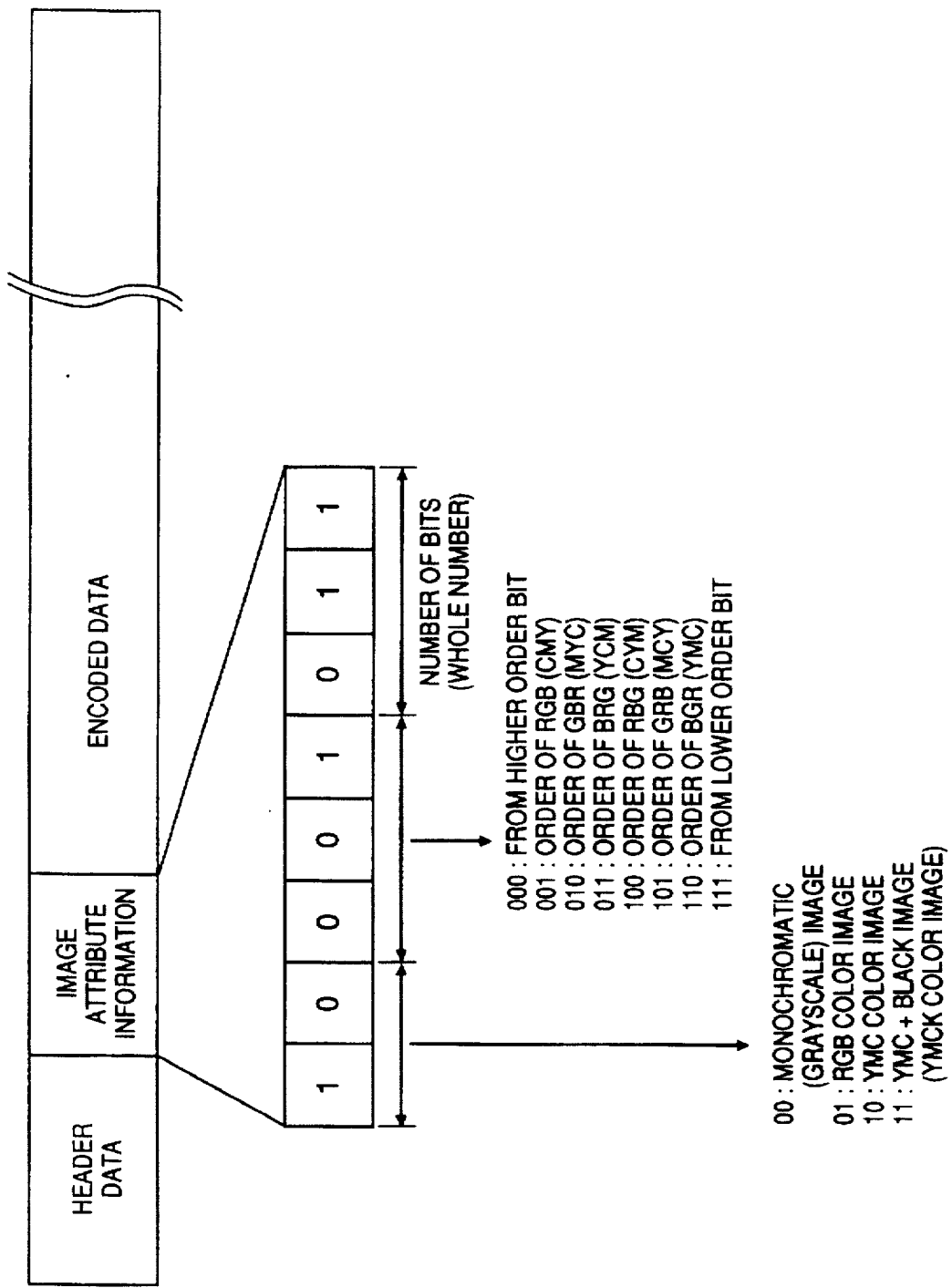

IMAGE ENCODING APPARATUS AND METHOD FOR GENERATING AND ENCODING REDUCED IMAGE DATA BY BIT PLANES

This application is a continuation of application Ser. No. 08/348,942 filed Nov. 25, 1994 abandoned.

BACKGROUND OF THE INVENTION

This invention relates to an image encoding apparatus and method such as an apparatus and method of hierarchically encoding an image.

A hierarchical encoding system for dealing with binary images is described in "Binary-Image Hierarchical Encoding System—JBIG Algorithm", *Gazo Denshi Gakkaishi*, Vol. 20, No. 1. An overview of this system will be described with reference to FIG. 1.

On the transmitting side, an original image 51a is repeatedly reduced by half vertically and horizontally by reducers 52 to generate n (three in FIG. 1) reduced images 51b, 51c, 51d the smallest of which (namely 51d) has been reduced to $½^n$ in size horizontally and vertically. After the smallest image 51d is encoded independently (i.e., with reference to other images) by encoders 53, the image 51d is transmitted. The encoding here is for obtaining a variable-length code by arithmetic encoding in which reference is made to peripheral pixels of a pixel of interest, namely the pixel to be encoded.

Next, after the image 51c is encoded by encoders 53, the image 51c is transmitted. The encoding here is for obtaining a variable-length code by arithmetic encoding in which reference is made to the image 51d. Thenceforth, and in similar fashion, the image 51b is encoded and transmitted and finally the original image 51a is encoded and transmitted.

The original image 51a is referred to as a "0th-layer image", and an image reduced n times is referred to as an "nth-layer image".

On the receiving side, first the smallest image 51d is decoded by decoders 54, then the image 51c is decoded by referring to the decoded image 51d. Thenceforth, and in similar fashion, the image 51b is decoded followed by the original image 51a.

In the JBIG algorithm, stripes obtained by partitioning the image in the sub-scan direction are defined as the units of encoding, and a sequential transmission is realized by these stripes. This is shown conceptually in FIG. 2, in which the original image 51a is partitioned into stripes from S0,0 to S7,0. Similarly, the image 51b is partitioned into stripes S0,1 to S7,1, and the image 51c is partitioned into stripes S0,2 to S7,2.

According to the JBIG algorithm, a bit plane method is indicated as an extension to a multivalued image or color image. A conceptual view of this is shown in FIG. 3, which illustrates an example of hierarchically encoding an image composed of four bits per pixel. A bit plane P1,0 of the most significant bit is reduced to produce a 1st-layer image P1,1, and the latter is reduced further to produce a 2nd-layer image P1,2. Similarly, bit planes P2,0, P3,0 and P4,0 (P4,0 is the -bit plane of the least significant bit) corresponding to respective bits are reduced to generate 1st-layer images P2,1, P3,1, P4,1 and 2nd-layer images P2,2, P3,2, P4,2, respectively. Encoding is performed for each bit plane. More specifically, the bit plane P1,2 is encoded independently, the bit plane P1,1 is encoded by referring to the bit plane P1,2, and the bit plane P1,0 is encoded by referring to the bit plane P1,1. Other bit planes are treated in the same manner.

FIG. 4 is a block diagram illustrating the construction of an apparatus for implementing such hierarchical encoding.

As shown in FIG. 4, the apparatus includes a scanner 501 for reading the image of an original and outputting eight-bit digital image data, a frame memory 502 for storing the image data outputted by the scanner 501, a bit-plane memory 504 for storing bit-plane data outputted by the frame memory 502, a bit-plane memory 505 for storing a reduced image produced at the time of hierarchical encoding, an encoder 506 for generating a layer image using the bit-plane memories 504, 505 and hierarchically encoding the layer image generated, a code buffer 507 for accumulating a generated code, a storage device 508 for storing generated code, and a CPU 509 for controlling these components via a bus 503. The latter is used to transmit image data, code and control signals.

In the apparatus of FIG. 4, image data outputted by the scanner 501 is stored successively in the frame memory 502 under the control of the CPU 509. When all of the image data has been stored in the frame memory 502, the CPU 509 acquires an area in the storage device 508, generates a header of code and stores the header at the beginning of this area. The header contains such information as image size, number of encoded layers and number of bit planes.

Next, the CPU 509 reads the image of the bit plane having the most significant out of the frame memory 502 and stores this image in the bit-plane memory 504. The CPU 509 clears the code buffer 507 and initializes the encoder 506, which is then made to start encoding.

The encoder 506 reduces the image that has been stored in the bit-plane memory 504 and stores the reduced image (the 1st-layer image) in the bit-plane memory 505. The encoder 506 then reduces the 1st-layer image stored in the bit-plane memory 505 and stores the resulting 2nd-layer image in the bit-plane memory 504.

An nth-layer image of minimum size is thus generated and this image is encoded and stored in the code buffer 507. The encoder 506 then notifies the CPU 509 of the fact that the encoding of the nth-layer image has been completed. Upon being so notified, the CPU 509 reads the code of the nth-layer image out of the code buffer 507 and stores the code in the storage device 508 following the header generated earlier.

Thenceforth, and in similar fashion, an nth-layer image is generated and encoded for every bit plane and the resulting images are stored successively in the storage device 508.

Next, through a procedure similar to that described above, the CPU 509 generates (n−1)th- and nth-layer images, encodes the (n−1)th-layer image by referring to the nth-layer image, stores the encoded image in the code buffer 507 and notifies the CPU 509 of the completion of encoding of the (n−1)th-layer image. Upon being so notified, the CPU 509 reads the code of the (n−1)th-layer image out of the code buffer 507 and stores the code in the storage device 508 following the code of the nth-layer image stored earlier.

Thenceforth, and in similar fashion, a 0th-layer image is encoded for every bit plane and the resulting images are stored successively in the storage device 508.

Thus, a header, the code of the nth-layer image of each bit plane, the code of the (n−1)th-layer image of each bit plane, . . . , the code of the 1st-layer image of each bit plane and the code of the 0th-layer image of each bit plane are stored in the storage device 508 in the order mentioned, whereby an encoded image file is produced. When operation for storing this data is finished, the CPU 509 closes the file of the storage device 509 and terminates encoding.

In a case where the scanner 501 outputs binary color-image data, encoding is performed color by color to produce the encoded image file.

The prior art described above has a number of shortcomings. Specifically, it is necessary to generate a layer image for each bit plane and color and to encode the layer image. Control of the encoder and frame memory is troublesome and managing the generated codes is complicated. In addition, it is required that the encoder be initialized for every bit plane, and there is a decline is encoding efficiency when dynamic arithmetic encoding is performed. Further, on the receiving side, it is impossible to judge whether the bit plane forms a color image or a monochromatic multivalued image, as a result of which a correct image cannot be reproduced.

SUMMARY OF THE INVENTION

An object of the present invention is to provide an image encoding apparatus and method for facilitating control of an encoder which encodes an image.

According to a preferred embodiment of the present invention, the foregoing object is attained by providing an image encoding apparatus for encoding image data of at least two bits per pixel, comprising partitioning means for partitioning input image data into bit planes, constructing means for constructing data of one image by joining the bit planes into which the input image has been partitioned by the partitioning means, and encoding means for encoding the image data constructed by the constructing means.

In a preferred embodiment, the encoding means for encoding the image data constructed by the constructing means.

Another object of the present invention is to provide an image encoding apparatus and method capable of reproducing an image conforming to the attributes of an original image.

According to a preferred embodiment of the present invention, the foregoing object is attained by providing an image encoding apparatus for encoding image data of at least two bits per pixel, comprising partitioning means for partitioning input image data into bit planes, constructing means for constructing data of one image by joining the bit planes into which the input image has been partitioned by the partitioning means, and encoding means for encoding the image data constructed by the constructing means.

In a preferred embodiment, the apparatus further comprises add-on means for adding on attribute information of the input image data applied to said partitioning means to a code outputted by said encoding means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a diagram for describing the concept of stripes defined by a JBIG algorithm;

FIG. 23 is a diagram showing the format of image attribute information.

DESCRIPTION OF THE PREFERRED EMBODIMENTS

Preferred embodiments of the present invention will now be described in detail with reference to the accompanying drawings.

First Embodiment

Figure 1:
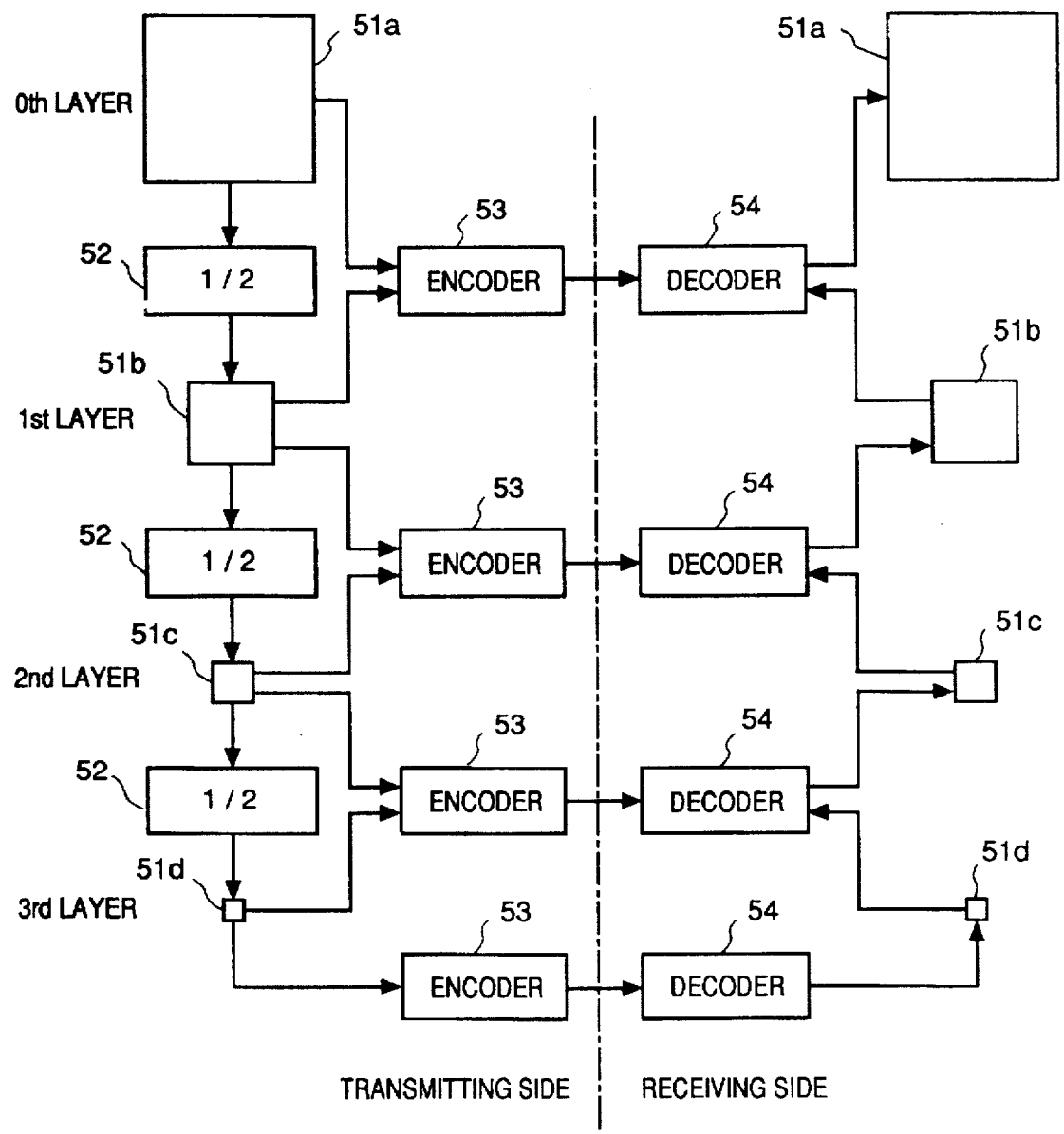
FIG. 1 is a diagram for describing the general features of hierarchical encoding of a binary image.
Figure 3:
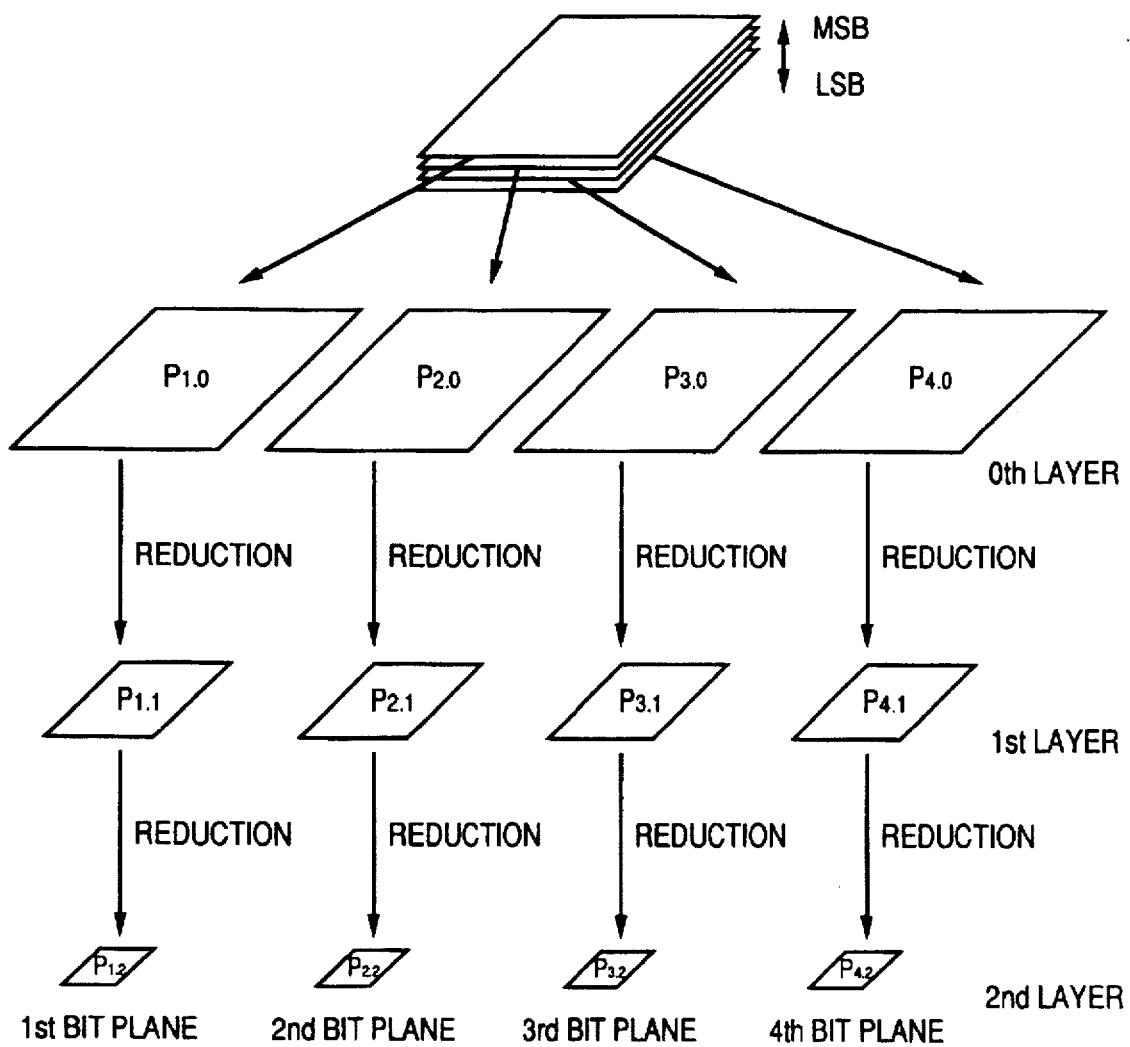
FIG. 3 is a diagram for describing the concept of a method in which the JBIG algorithm is extended to a multivalued image or color image.
Figure 4:
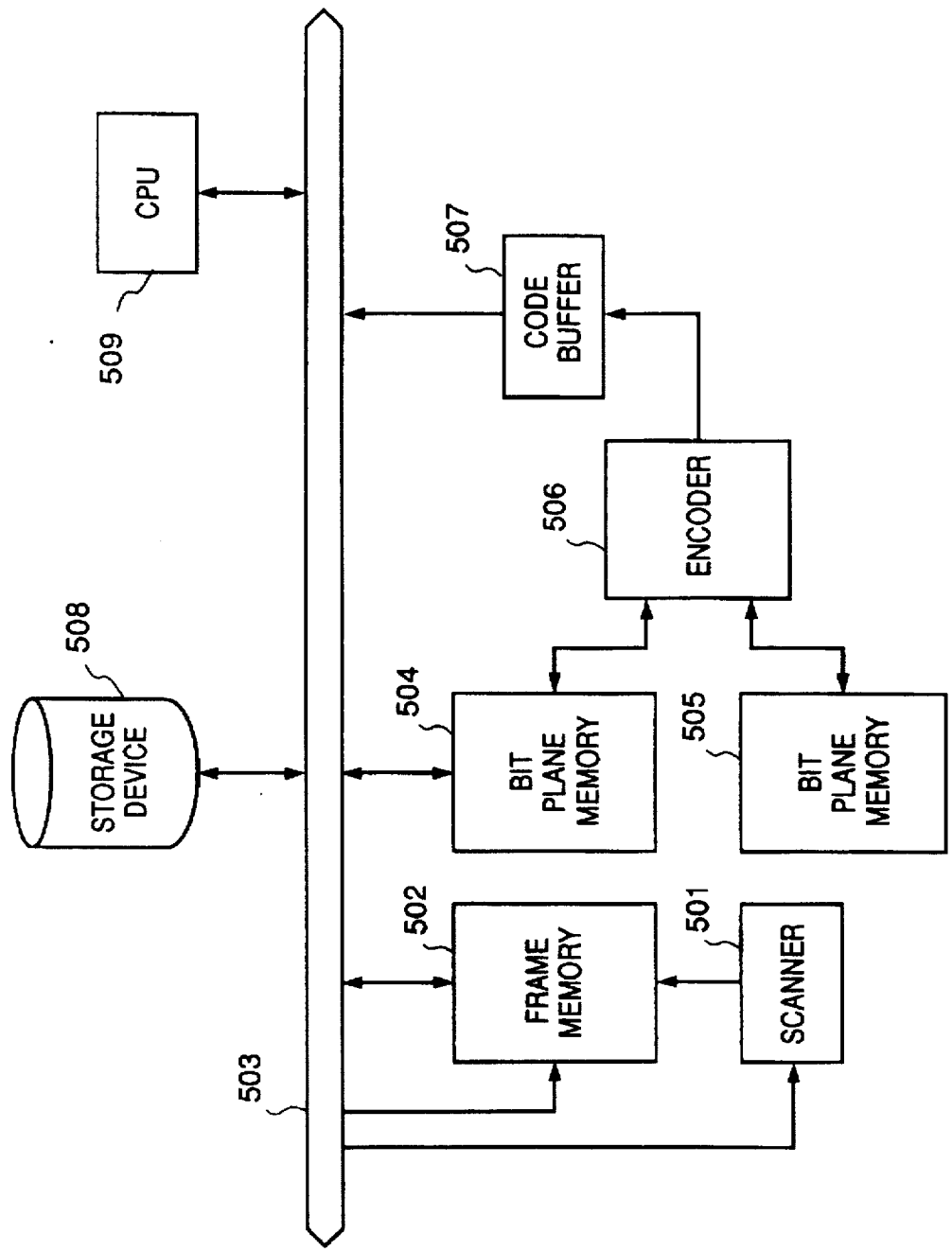
FIG. 4 is a block diagram showing the construction of an apparatus for implementing the hierarchical encoding of FIG. 1.
Figure 5:
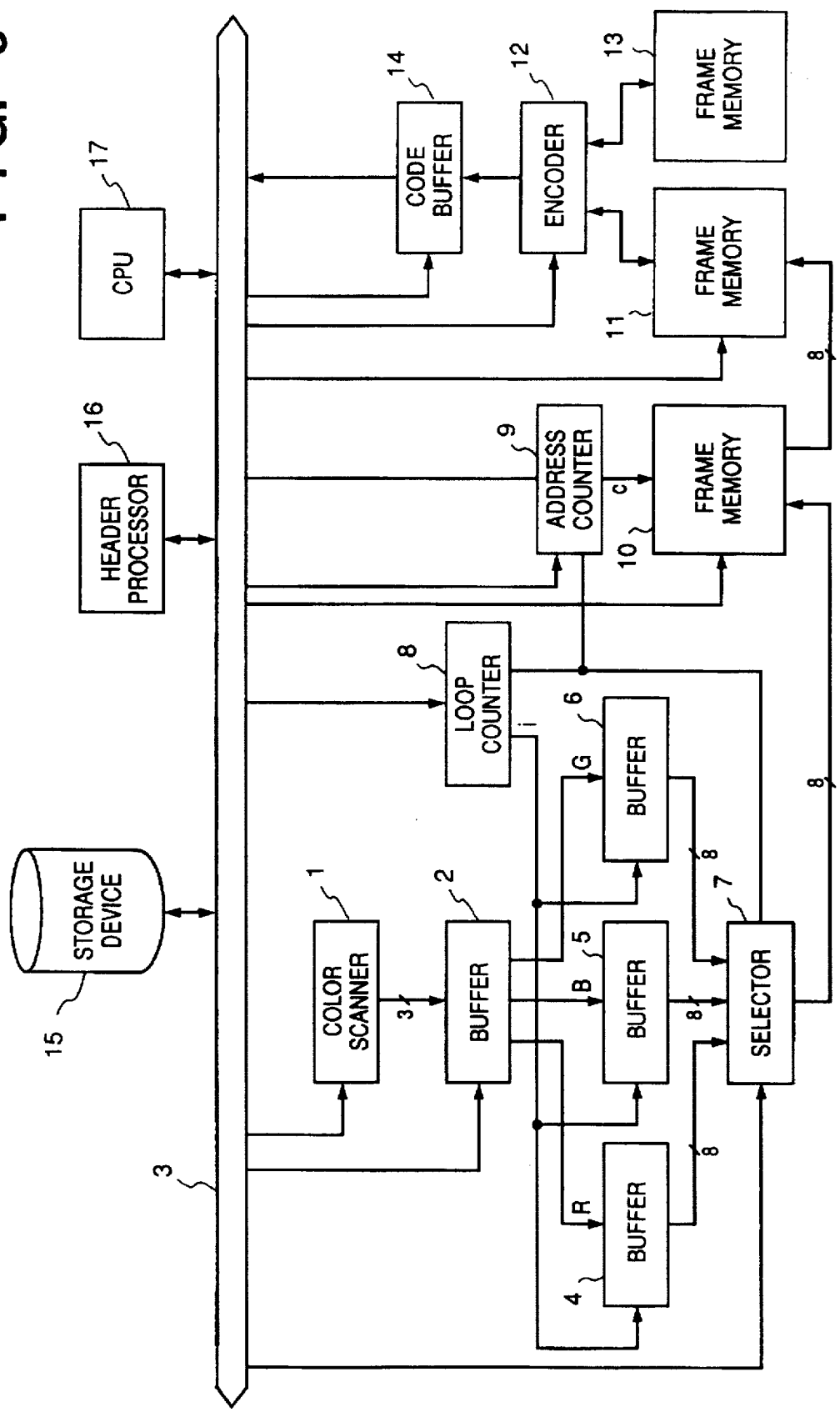
FIG. 5 is a block diagram showing the construction of an image encoding apparatus according to a first embodiment of the present invention.
Figure 6:
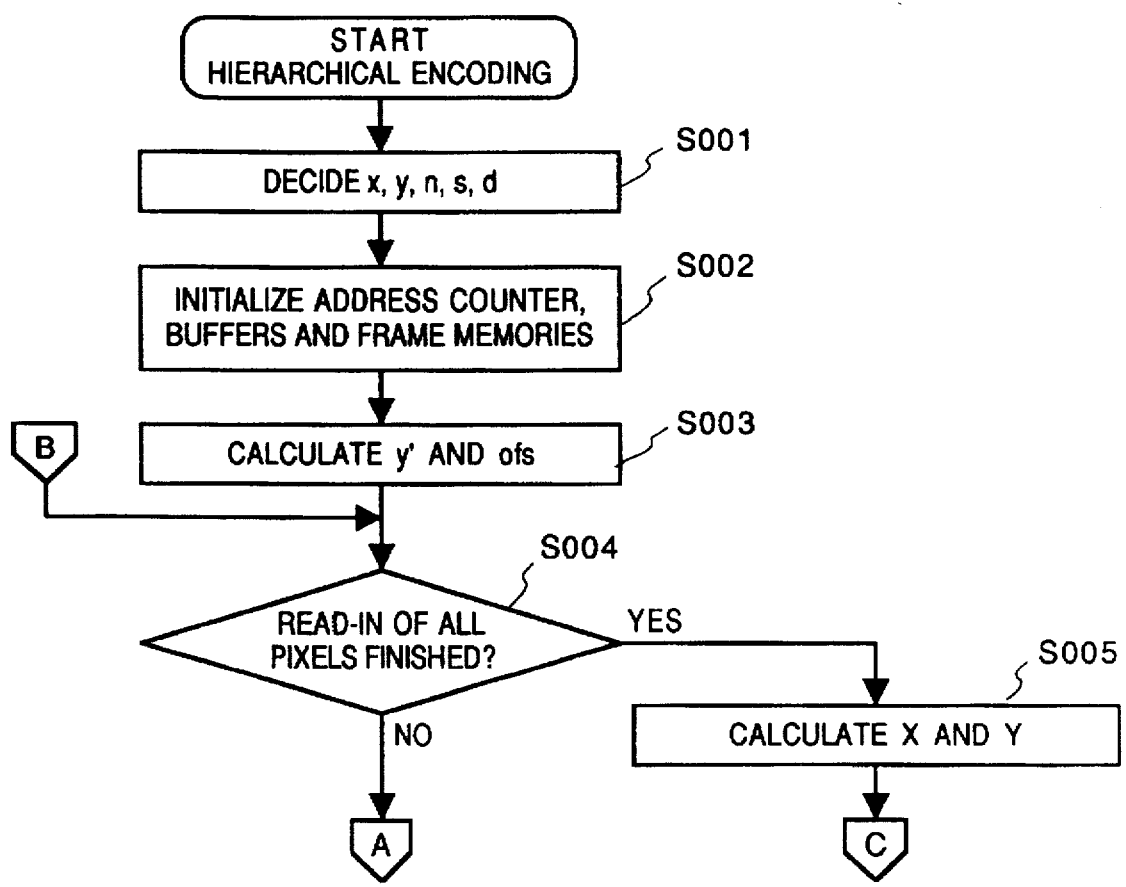
FIGS. 6 through 9 are flowcharts illustrating a hierarchical encoding procedure according to the first embodiment.
Figure 7:
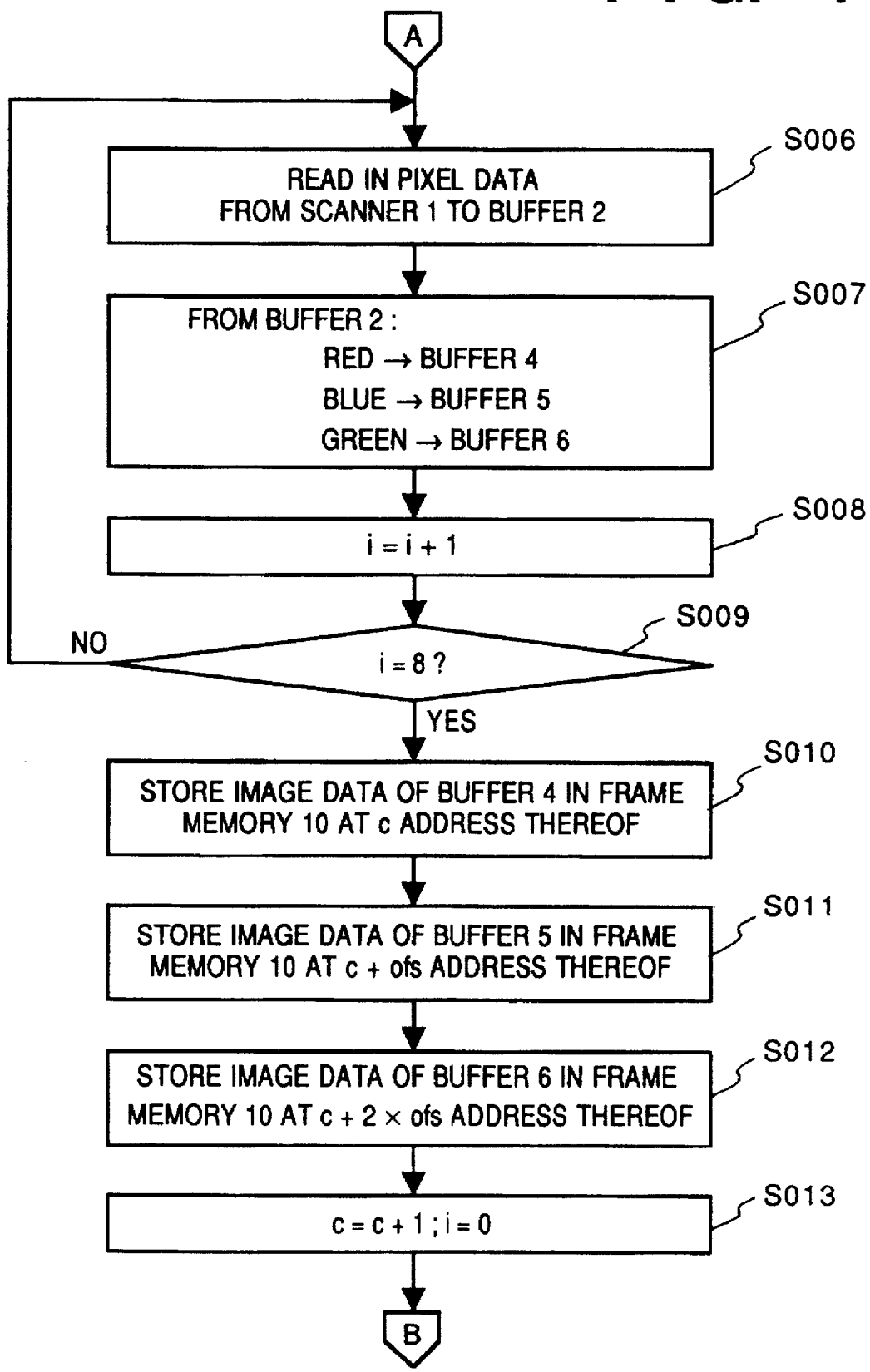
Figure 8:
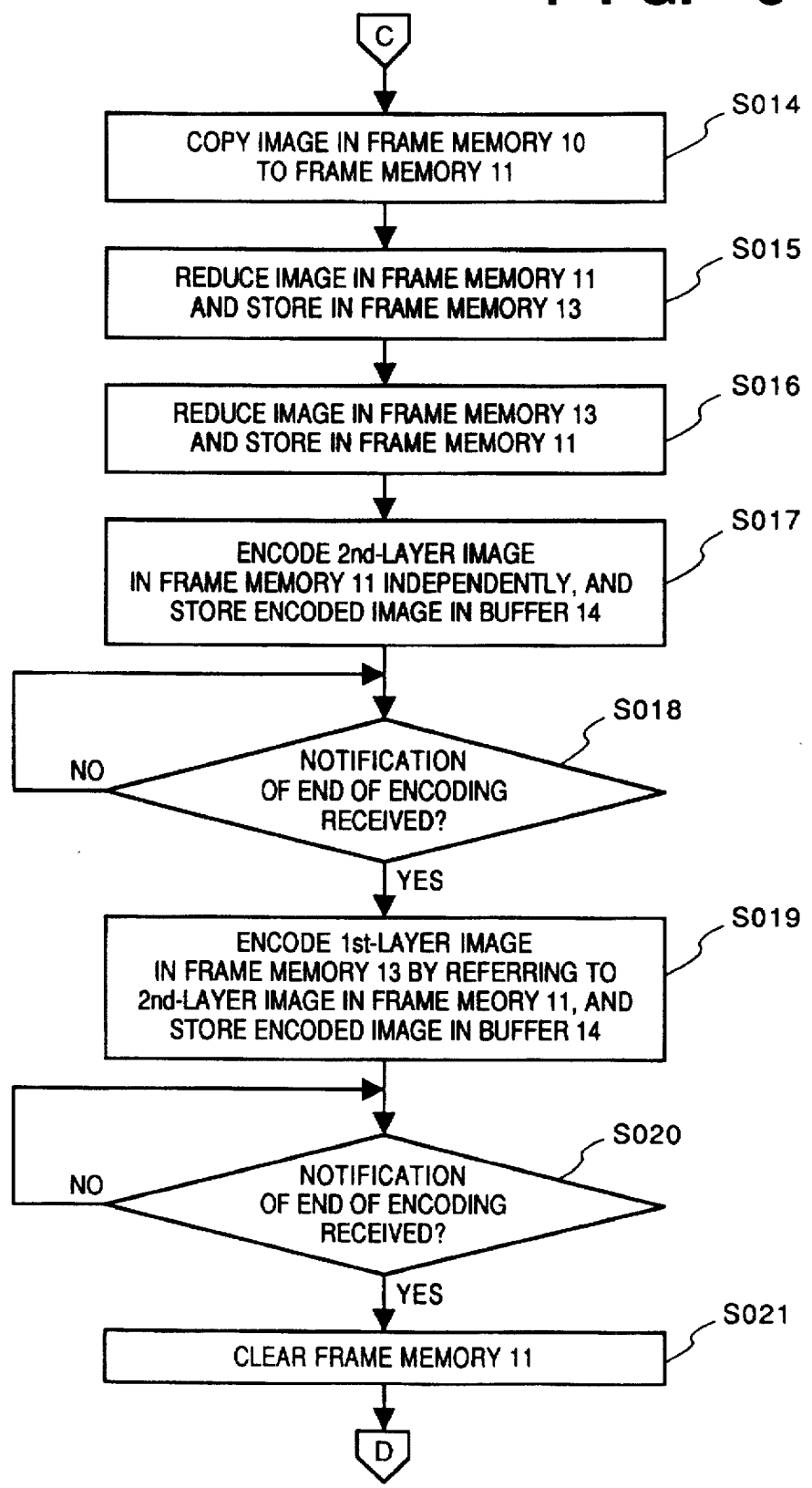
Figure 9:
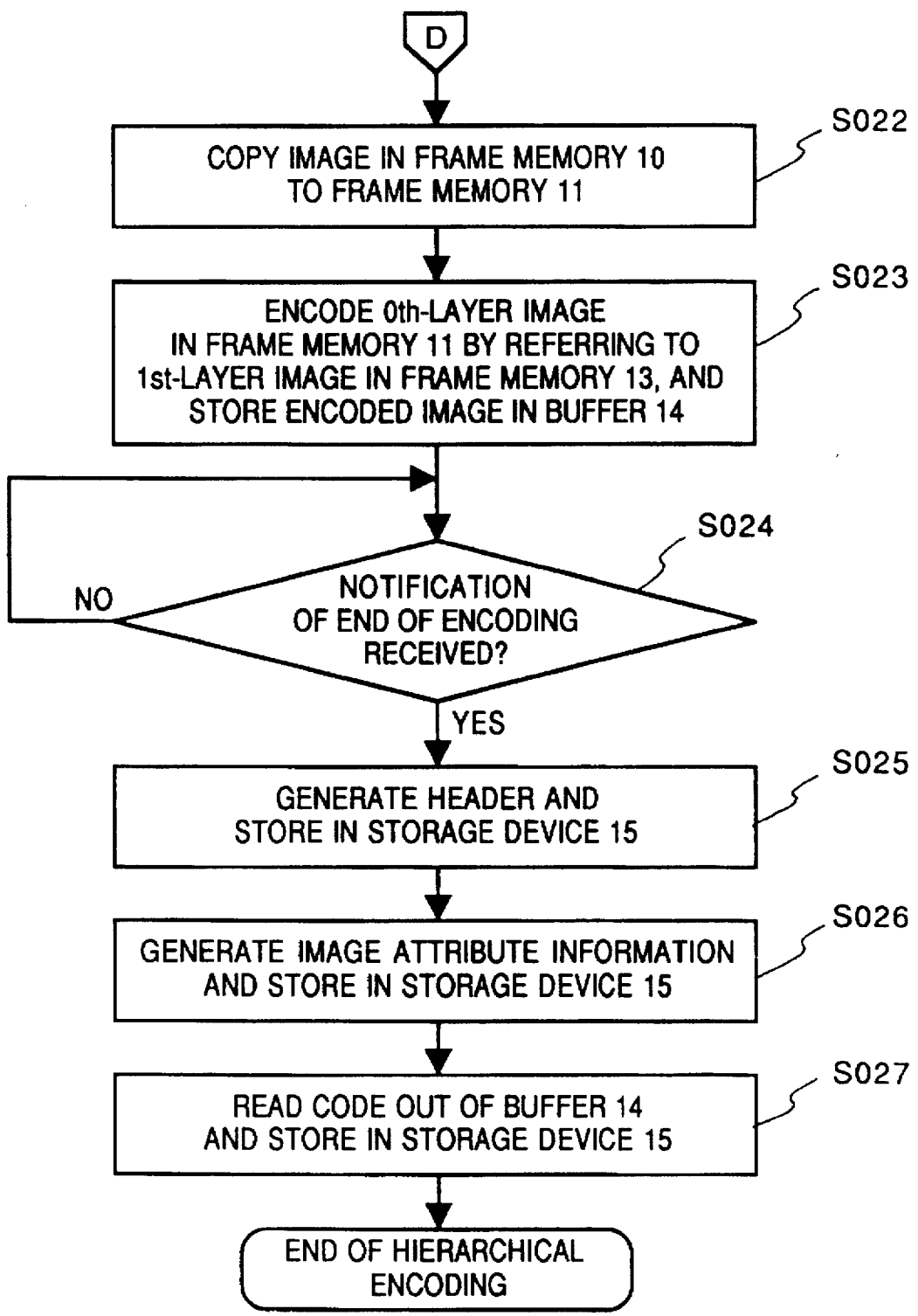

FIG. 5 is a block diagram showing the construction of an image encoding apparatus according to a first embodiment of the present invention.

As shown in FIG. 5, the apparatus includes a CPU 17 such as a single-chip microprocessor. The CPU 17 controls the components mentioned below, in accordance with a program that has been stored in an internal ROM or the like, via a bus 3 used to transmit image data, code and control signals, etc.

A color scanner 1 reads the image of an original and outputs binary color-image data in the form of a point sequence. Pixels for which the value of each color is "0" are white. A buffer 2 for three bits per pixel accumulates the image data outputted by the color scanner 1. Buffers 4, 5, 6 for one bit per pixel accumulate bit planes in which image data that has been accumulated in the buffer 2 is partitioned according to color. The buffers 4, 5 and 6 correspond to the colors red, blue and green.

In accordance with a signal from the CPU 17, a selector 7 selects and outputs data from the buffer 4, 5 or 6. A loop counter 8 controls the buffers 4, 5, 6. An image, which is to be encoded, outputted by the selector 7 is stored in byte units in a frame memory 10. An address counter 9 manages the address of the frame memory 10.

Reduced images, which are produced at the time of hierarchical encoding, are stored in byte units in frame memories 11, 13. In accordance with the JBIG method, an encoder 12 generates layer images using the frame memory 11 and hierarchically encodes the layer images generated. The generated code is accumulated in a code buffer 14.

A storage device 15 stores generated code. A header processor 16 generates a header attached to the head of a code.

Hierarchical encoding of a binary image according to the JBIG method will now be described as an example. Though the minimum size of an image is made the 2nd layer and the number of stripes of the 0th layer is made 128, this does not place a limitation upon the invention.

FIGS. 6 through 9 are flowcharts illustrating the procedure of hierarchical encoding according to this embodiment. The processing of these flowcharts is executed by the CPU 17.

The image size of the image to be encoded, the bit depth, the stripe width and the number of layers are decided at step S001. Let image size in the main-scan direction, image size in the sub-scan direction, bit depth, stripe width and number of layers be represented by x, y, n, s and d, respectively, in the following description. Further, in order to simplify the description, let x be a multiple of 8, and let x=3,072, y=4,090, n=3, s=128, d=3 hold.

Next, at step S002, the address counter 9, the buffers 2, 4, 5, 6, 14 and the frame memories 10, 11, 13 are initialized. That is, the count c of the address counter 9 is made zero and the buffers and frame memories are cleared.

This is followed by step S003, at which a loop variable i of the loop counter 8 is made zero and, moreover, corrected image size y' in the sub-scan direction and an offset value ofs are obtained in accordance with the equations below. It should be noted that any remainder in the result of division is discarded. Further, ofs in this embodiment is 1,572,864.

$$y' = (y+s-1)/s \times s \quad (1)$$

$$ofs = y' \times x/8 \quad (2)$$

The program proceeds to step S006 via step S004. At step S006, the color scanner 1 is caused to read the image of the original and pixel data of three bits per pixel is stored successively in the buffer 2. The image data that has been stored in the buffer 2 is read out upon being separated according to color at step S007, and the read data is stored in the buffers 4, 5, 6. More specifically, the red bit of the pixel data is stored at an i-th bit of the buffer 4 in dependence upon the loop variable i of the loop counter 8. Similarly, the blue bit is stored at the i-th bit of buffer 5 and the green bit is stored at the i-th bit of buffer 6.

The loop variable i is incremented at step S008 and the loop variable i is judged at step S009. The procedure composed of the series of steps S006 to S008 is repeated until the loop variable i becomes 8.

When the loop variable i attains the value of 8 at step S009, one byte of bit plane data will have been generated in the buffers 4, 5, 6. The data that has been stored n the buffers 4, 5, 6 is read out and planted in the frame memory 10. First, at step S010, the selector 7 is made to select the buffer 4 and one byte of the color red is stored at the c address of the frame memory 10. The selector 7 is made to select the buffer 5 and one byte of the color blue is stored at address c+ofs of frame memory 10 at step S011. The selector 7 is made to select the buffer 6 and one byte of the color green is stored at address c+2ofs of frame memory 10 at step S012.

This is followed by step S013, at which the count c in the address counter 9 is incremented and the loop variable i of the loop counter 8 is made zero. The program then returns to step S004. The procedure composed of steps S004 to S013 is repeated until the reading in of all pixels is concluded.

By virtue of the foregoing procedure, image data in which three bit planes are serially connected at a spacing equivalent to the offset value ofs is constructed in the frame memory 10.

When all of the pixel data has been stored in the frame memory 10 ("YES" at step S004), the image size of the original image is corrected to X, Y obtained in accordance with the following equations:

$$X = x \quad (3)$$

$$Y = y' \times n \quad (4)$$

Next, at step S014, the image data of image size (X,Y) stored in the frame memory 10 is copied to the frame memory 11. The encoder 12 is started at step S015 to generate a 1st-layer image and store the image in the frame memory 13. A 2nd-layer image is generated from the 1st-layer image by the encoder 12 and stored in the frame memory 11 at step S016.

This is followed by step S017, at which all of the pixel data of the 2nd-layer image stored in the frame memory 11 is encoded by the encoder 12 and the generated code is stored in the code buffer 14 in order from the beginning of the buffer.

When notification of the fact that encoding of the 2nd-layer image has been concluded is received from the encoder 12 at step S018, the program proceeds to step S019. Here all of the pixel data of the 1st-layer image in frame memory 13 is encoded by the encoder 12 with reference being made to the 2nd-layer image in frame memory 11, and the generated code is stored in the code buffer 14 following the stored code of the 2nd-layer image.

When notification of the fact that encoding of the 1st-layer image has been concluded is received from the encoder 12 at step S020, the frame memory 11 is cleared at step S021, and the image data of image size (X,Y) stored in the frame memory 10 is copied to the frame memory 11 again at step S022. Then, at step S023, all of the pixel data of the 0th-layer image in frame memory 11 is encoded by the encoder 12 with reference being made to the 1st-layer image in frame memory 13, and the generated code is stored in the code buffer 14 following the stored code of the 1st-layer image.

When notification of the fact that encoding of the 0th-layer image has been concluded is received from the encoder 12 at step S024, the header processor 16 is started at step S025 in order to generate a header from the aforementioned X, Y, s, d and the encoded data order (LOW-TO-HIGH: low-resolution data is at the beginning) and store the header in a prescribed area of the storage device 15. Next, at step S026, a single byte of data representing the bit depth n of the original image is stored, as image attribute information, following the header stored in the storage device 15 by the header processor 16. Then, at step S027, all of the code that has been stored in the code buffer 14 is stored in the storage device 15 following the image attribute information. Hierarchical encoding is then terminated.

Thus, in accordance with this embodiment, bit-plane images are generated, a single image is constructed by joining a plurality of the bit-plane images, layer images are generated and these are encoded. As a result, in comparison with the case in which layer images are generated for each bit plane and then encoded, control of the encoder and frame memories is facilitated and control of the generated code is made easier. Furthermore, it is unnecessary to initialize the encoder every bit plane and there is no decline in encoding efficiency when dynamic arithmetic coding is carried out.

Second Embodiment

An image encoding apparatus according to a second embodiment of the present invention will now be described. Components in the second embodiment that are substantially the same as those of the first embodiment are designated by like reference characters and need not be described in detail again.

Figure 10:
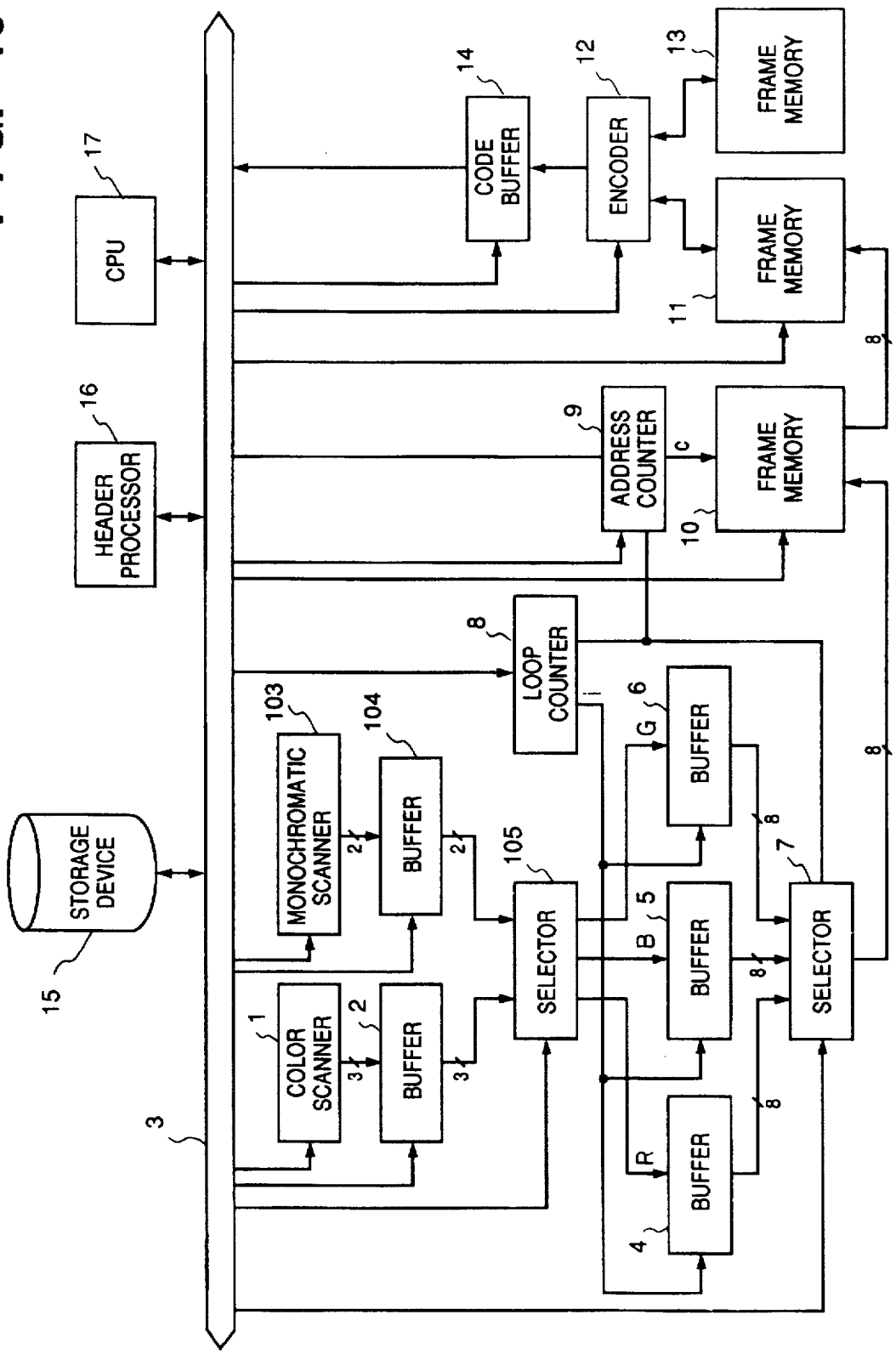
FIG. 10 is a block diagram showing the construction of an image encoding apparatus according to a second embodiment of the present invention.
Figure 11:
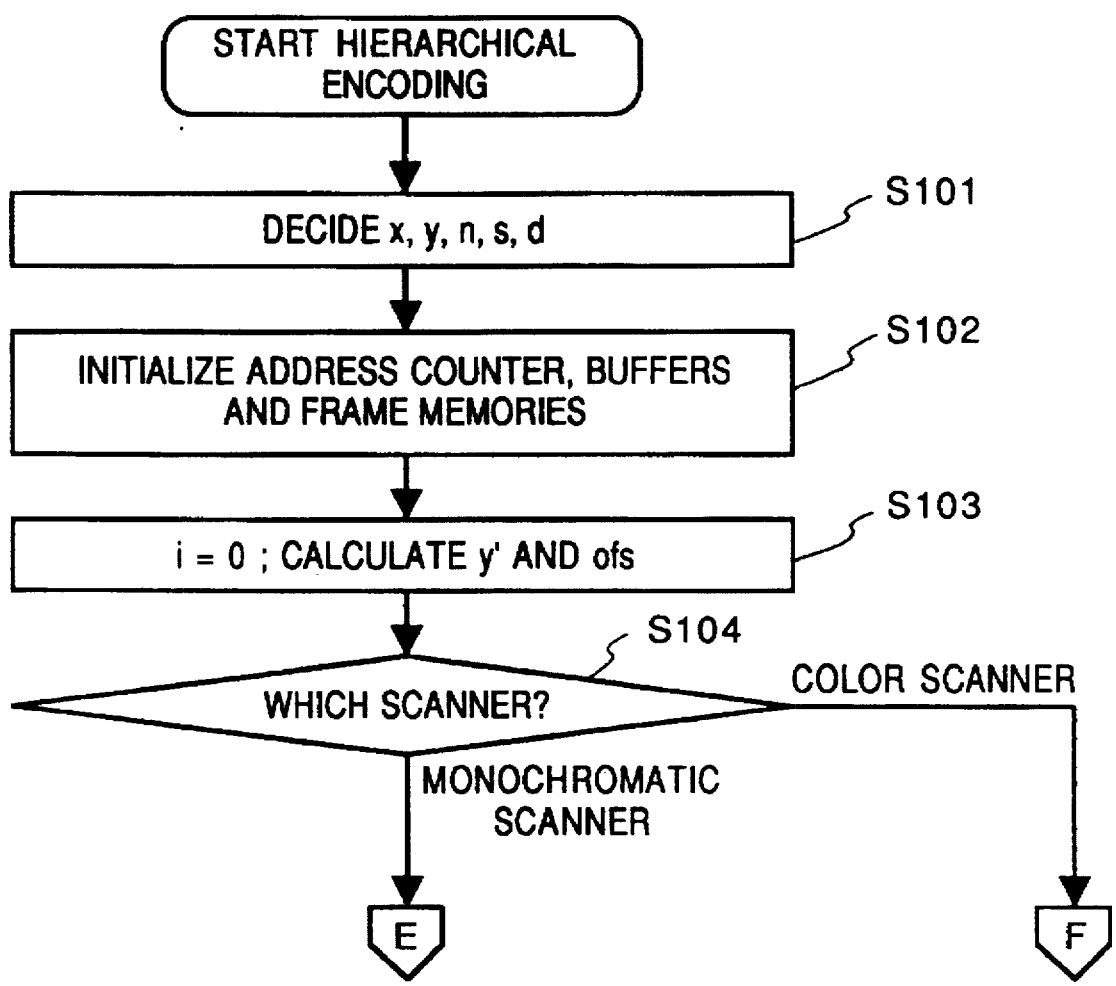
FIGS. 11 through 15 are flowcharts illustrating a hierarchical encoding procedure according to the second embodiment.
Figure 12:
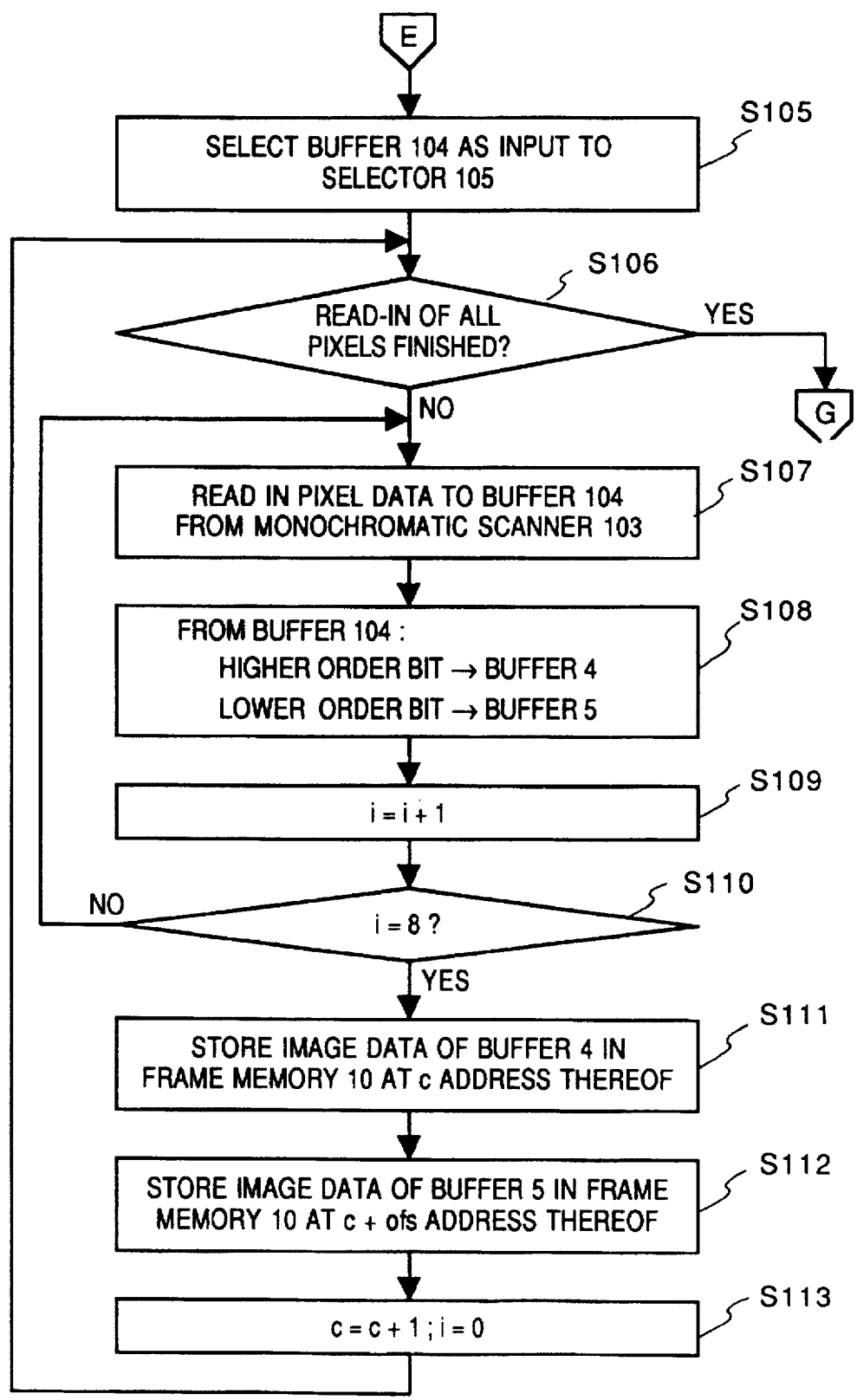
Figure 13:
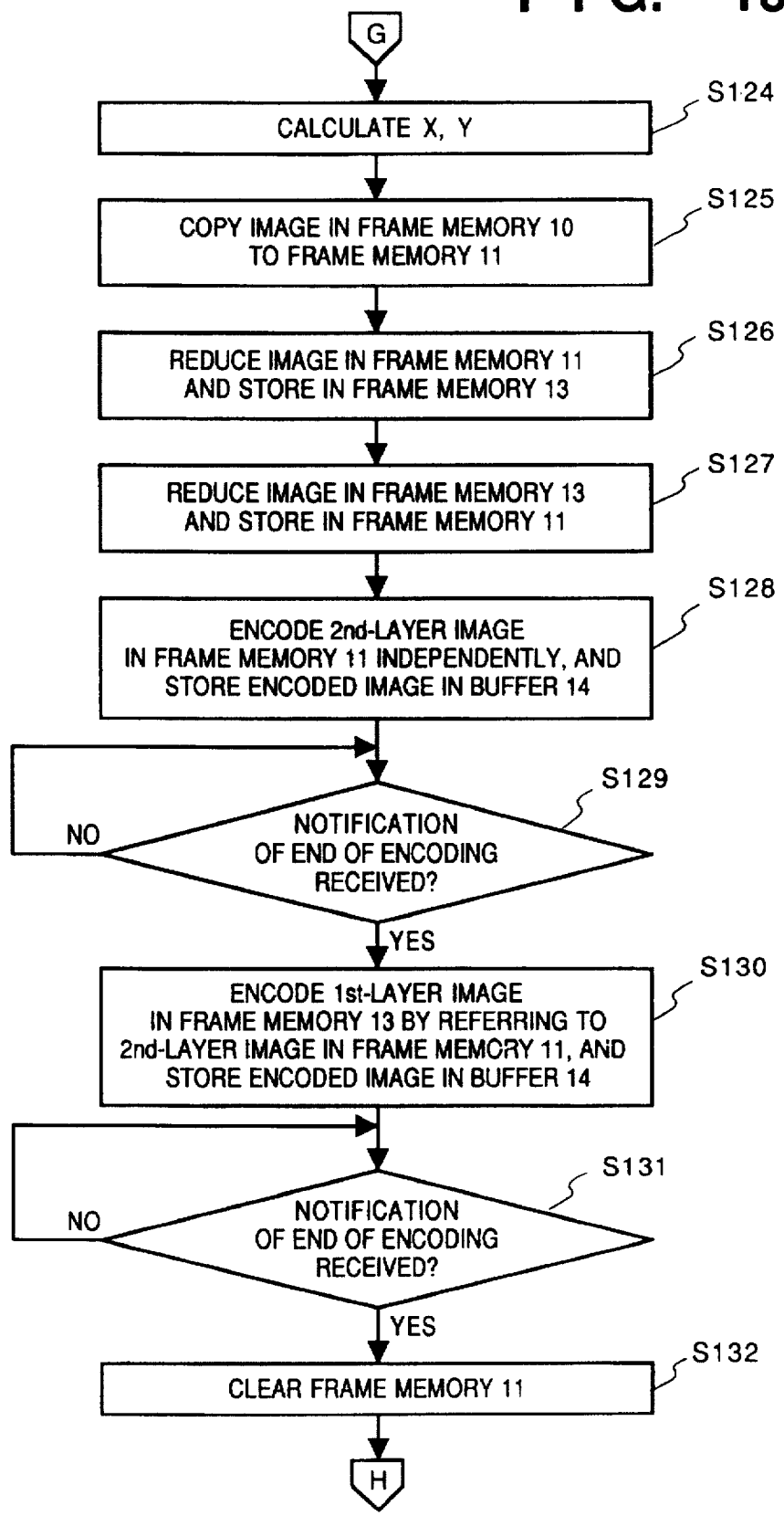
Figure 14:
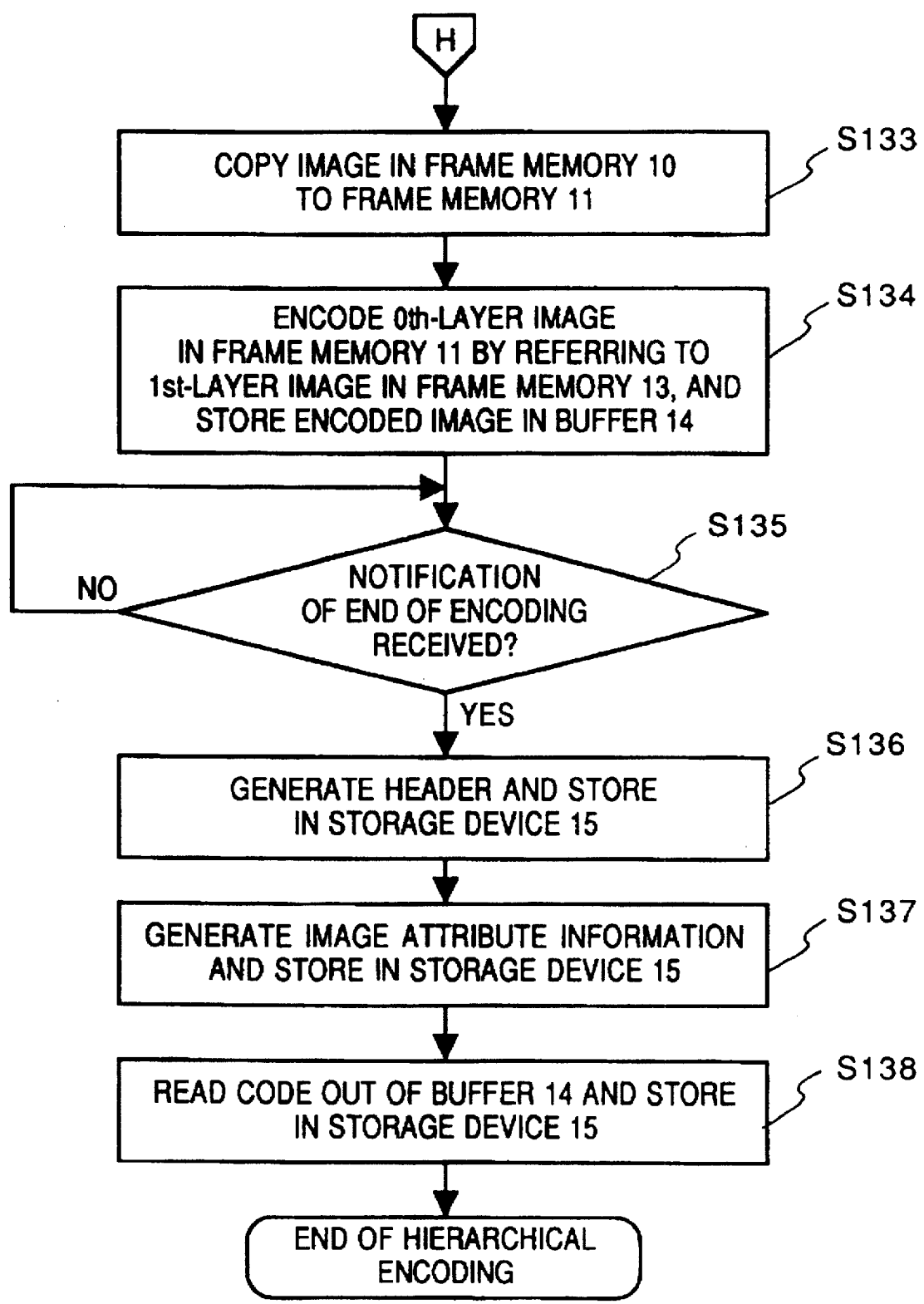
Figure 15:
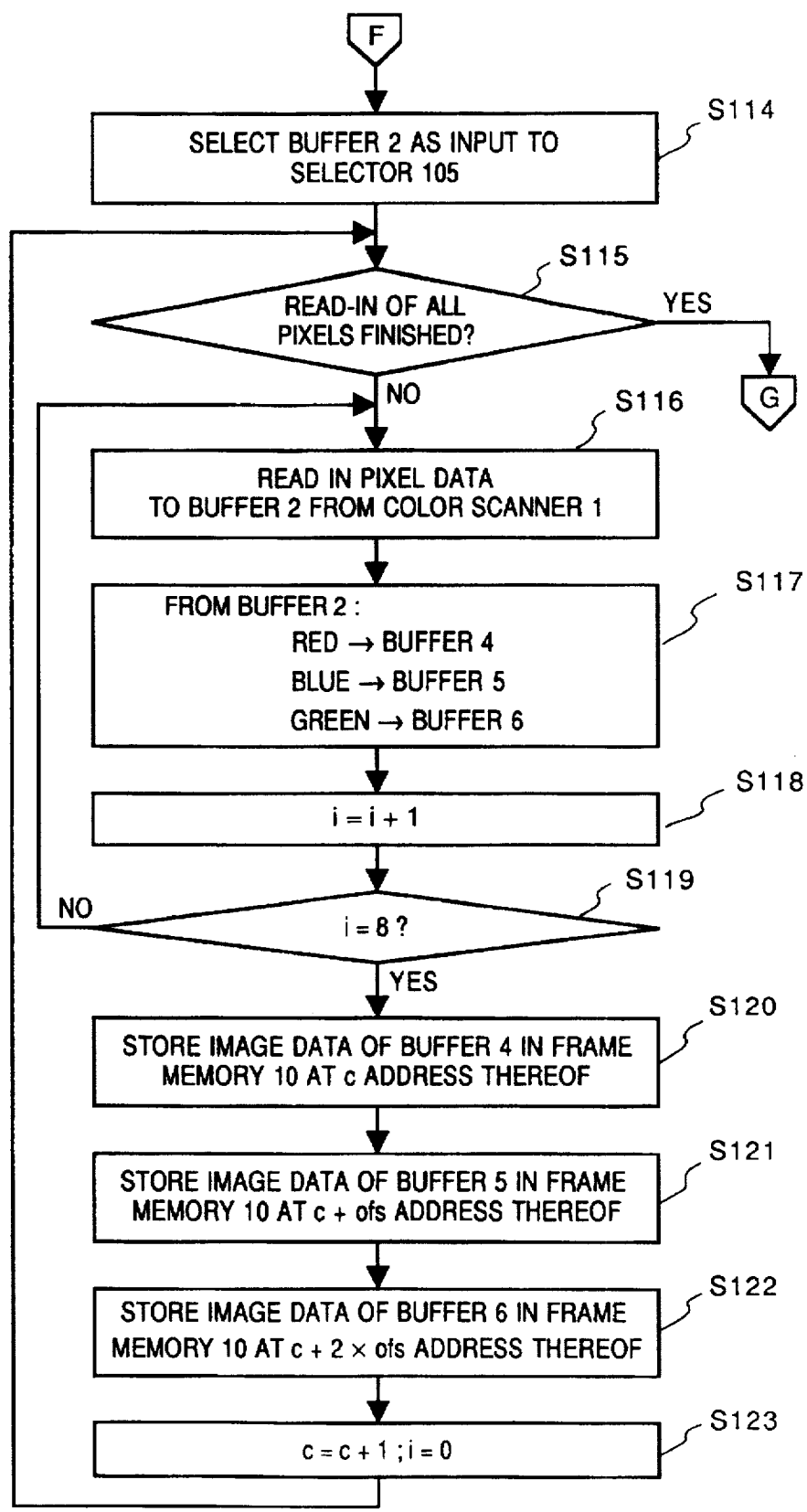

FIG. 10 is a block diagram showing the construction of an image encoding apparatus according to a second embodiment of the present invention.

The apparatus of FIG. 10 includes a monochromatic scanner 103 for reading the image of an original and outputting image data having four gray levels. A buffer 104 for two bits per pixel accumulates the image data outputted by the monochromatic scanner 103. In accordance with a signal from the CPU 17, a selector 105 selects the image data outputted by the buffer 2 or buffer 104 and sends the selected image data to the buffers 4, 5 and 6.

In this embodiment, the buffer 4 stores either the red bit or the most significant bit that is outputted by the monochromatic scanner 103, the buffer 5 stores either the blue bit or the least significant bit that is outputted by the monochromatic scanner 103, and the buffer 6 stores the green bit.

Hierarchical encoding of a binary image according to the JBIG method will now be described as an example. Though the minimum size of an image is made the 2nd layer and the number of stripes of the 0th layer is made 64, this does not place a limitation upon the invention.

FIGS. 11 through 15 are flowcharts illustrating the procedure of hierarchical encoding according to this embodiment. The processing of these flowcharts is executed by the CPU 17.

When there is a request for reading in an image from the color scanner 1 or monochromatic scanner 103, the image size of the image to be encoded, the bit depth, the stripe width and the number of layers are decided at step S101. Let image size in the main-scan direction, image size in the sub-scan direction, bit depth, stripe width and number of layers be represented by x, y, n, s and d, respectively, in the following description. Further, in order to simplify the description, let x be a multiple of 8, and let x=2,048, y=3,069, s=64, d=3 hold. The bit depth n is 3 in the case of the color scanner 1 and 2 in the case of the monochromatic scanner 103.

Next, at step S102, the address counter 9, the buffers 2, 4, 5, 6, 14, 104 and the frame memories 10, 11, 13 are initialized. That is, the count c of the address counter 9 is made zero and the buffers and frame memories are cleared.

This is followed by step S103, at which a loop variable i of the loop counter 8 is made zero and, moreover, corrected image size y' in the sub-scan direction and an offset value ofs are obtained in accordance with the above-mentioned Equations (1) and (2), respectively. It should be-noted that any remainder in the result of division is discarded. Further, ofs in this embodiment is 792,576.

Processing branches at step S104 depending upon the scanner which issued the image read-in request. A case in which the monochromatic (grayscale) image is read in by the monochromatic scanner 103 will be described first.

The selector 105 is made to select the buffer 104 at step S105 and then the program proceeds to step S107 via step S106. At step S107, the monochromatic scanner 103 is caused to read the image of the original and pixel data of two bits per pixel is stored successively in the buffer 104. The image data that has been stored in the buffer 104 is read out upon being separated according to bit at step S108, and the read data is stored in the buffers 4 and 5. More specifically, the most significant bit of the pixel data is stored at an i-th bit of the buffer 4 in dependence upon the loop variable i of the loop counter 8. Similarly, the least significant bit is stored at the i-th bit of buffer 5.

The loop variable i is incremented at step S109 and the loop variable i is judged at step S110. The procedure composed of the series of steps S105 to S109 is repeated until the loop variable i becomes 8.

When the loop variable i attains the value of 8 at step S110, one byte of bit plane data will have been generated in the buffers 4 and 5. The data that has been stored n the buffers 4 and 5 is read out and planted in the frame memory 10. First, at step S111, the selector 7 is made to select the buffer 4 and the higher order byte is stored at the c address of the frame memory 10. The selector 7 is made to select the buffer 5 and the lower order byte is stored at address c+ofs of frame memory 10 at step S111.

This is followed by step S113, at which the count c in the address counter 9 is incremented and the loop variable i of the loop counter 8 is made zero. The program then returns to step S106. The procedure composed of steps S106 to S113 is repeated until the reading in of all pixels is concluded.

When all of the pixel data has been stored in the frame memory 10 ("YES" at step S106), the image size of the original image is corrected to X, Y obtained in accordance with the Equations (3), (4). Next, at step S125, the image data of image size (X,Y) stored in the frame memory 10 is copied to the frame memory 11. The encoder 12 is started at step S126 to generate a 1st-layer image and store the image in the frame memory 13. A 2nd-layer image is generated from the 1st-layer image by the encoder 12 and stored in the frame memory 11 at step S127.

This is followed by step S128, at which all of the pixel data of the 2nd-layer image stored in the frame memory 11 is encoded by the encoder 12 and the generated code is stored in the code buffer 14 in order from the beginning of the buffer.

When notification of the fact that encoding of the 2nd-layer image has been concluded is received from the encoder 12 at step S129, the program proceeds to step S130. Here all of the pixel data of the 1st-layer image in frame memory 13 is encoded by the encoder 12 with reference being made to the 2nd-layer image in frame memory 11, and the generated code is stored in the code buffer 14 following the stored code of the 2nd-layer image.

When notification of the fact that encoding of the 1st-layer image has been concluded is received from the encoder 12 at step S131, the frame memory 11 is cleared at step S132, and the image data of image size (X,Y) stored in the frame memory 10 is copied to the frame memory 11 again at step S133. Then, at step S134, all of the pixel data of the 0th-layer image in frame memory 11 is encoded by the encoder 12 with reference being made to the 1st-layer image in frame memory 13, and the generated code is stored in the code buffer 14 following the stored code of the 1st-layer image.

When notification of the fact that encoding of the 0th-layer image has been concluded is received from the encoder 12 at step S135, the header processor 16 is started at step S136 in order to generate a header from the aforementioned X, Y, s, d and the encoded data order (LOW-TO-HIGH: low-resolution data is at the beginning) and store the header in a prescribed area of the storage device 15. Next, at step S137, data representing the bit depth n of the original image and the type of image [which, in this case, is multivalued black-and-white (grayscale)] is stored, as image attribute information, following the header stored in the storage device 15 by the header processor 16. Then, at step S138, all of the code that has been stored in the code buffer 14 is stored in the storage device 15 following the image attribute information. Hierarchical encoding is then terminated.

Figure 16:
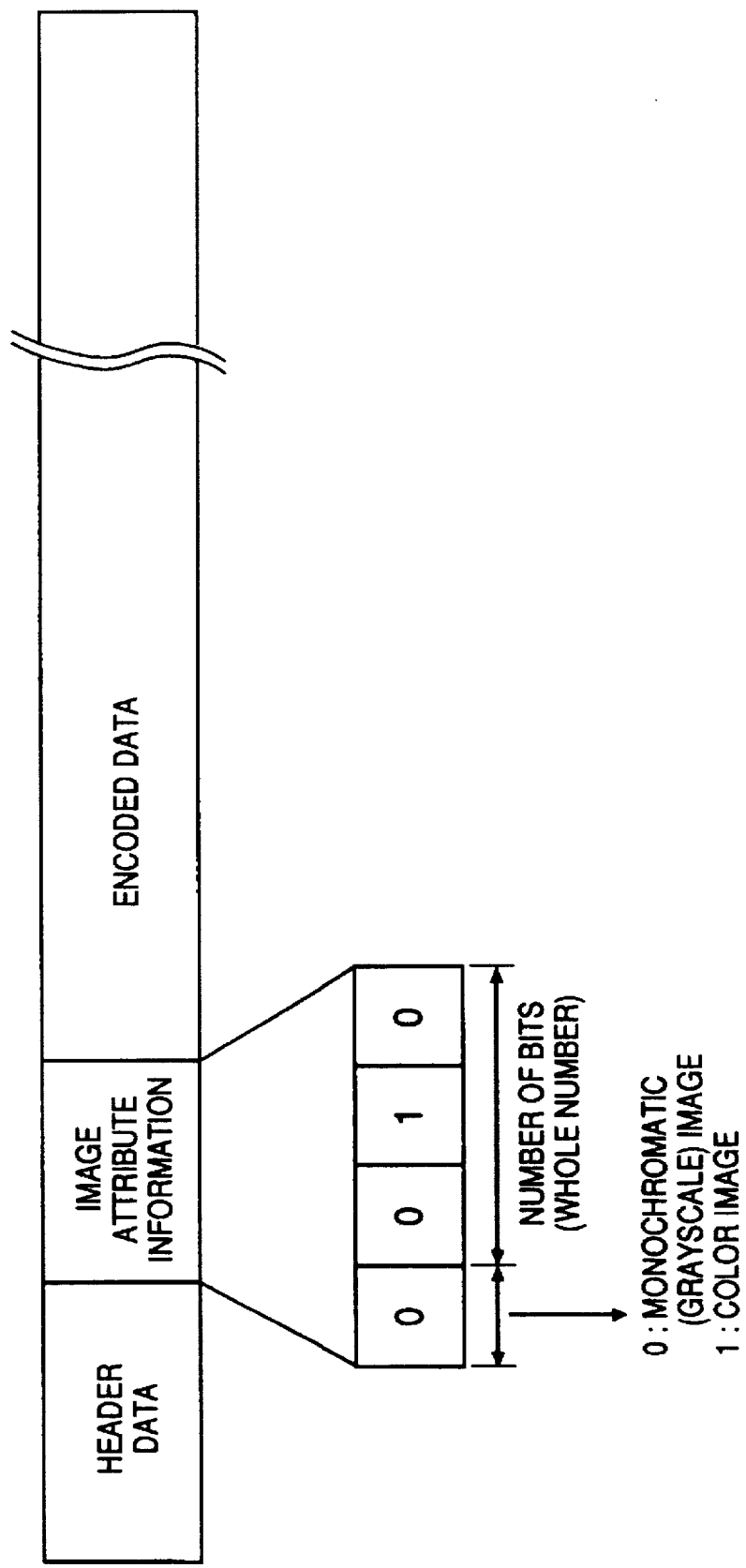
FIG. 16 is a diagram showing the format of image attribute information.

FIG. 16 is a diagram illustrating the format of the image attribute information. The attribute information is composed of four bits. The most significant bit distinguishes the image, with "0" indicating black-and-white (grayscale) and "1" indicating color. The three remaining least significant bits represent the bit depth.

In a case where the color image is read in by the color scanner 1, the program branches from step S104 to step S114. Here the selector 105 is made to select the buffer 2 and then the program proceeds to step S116 via step S115. At step S116, the color scanner 1 is caused to read the image of the original and pixel data of three bits per pixel is stored successively in the buffer 2. The image data that has been stored in the buffer 2 is read out upon being separated according to color at step S117, and the read data is stored in the buffers 4, 5, 6. More specifically, the red bit of the pixel data is stored at an i-th bit of the buffer 4 in dependence upon the loop variable i of the loop counter 8. Similarly, the blue bit is stored at the i-th bit of buffer 5 and the green bit is stored at the i-th bit of buffer 6.

The loop variable i is incremented at step S118 and the loop variable i is judged at step S119. The procedure composed of the series of steps S116 to S118 is repeated until the loop variable i becomes 8.

When the loop variable i attains the value of 8 at step S119, one byte of bit plane data will have been generated in the buffers 4, 5, 6. The data that has been stored n the buffers 4, 5, 6 is read out and planted in the frame memory 10. First, at step S120, the selector 7 is made to select the buffer 4 and one byte of the color red is stored at the c address of the frame memory 10. The selector 7 is made to select the buffer 5 and one byte of the color blue is stored at address c+ofs of frame memory 10 at step S121. The selector 7 is made to select the buffer 6 and one byte of the color green is stored at address c+2ofs of frame memory 10 at step S122.

This is followed by step S123, at which the count c in the address counter 9 is incremented and the loop variable i of the loop counter 8 is made zero. The program then returns to step S115. The procedure composed of steps S115 to S123 is repeated until the reading in of all pixels is concluded.

When all of the pixel data has been stored in the frame memory 10, the program proceeds to step S124. From this point onward a procedure identical to that for the case in which the image was read in by the monochromatic scanner 103 is executed.

Thus, in accordance with the second embodiment, effects similar to those of the first embodiment can be expected. Moreover, since the type of image (e.g., multivalued black-and-white or color) can be judged based upon the image attribute information, the correct image can be reproduced on the receiving side.

Third Embodiment

An image encoding apparatus according to a third embodiment of the present invention will now be described. Components in the third embodiment that are substantially the same as those of the first embodiment are designated by like reference characters and need not be described in detail again.

Figure 17:
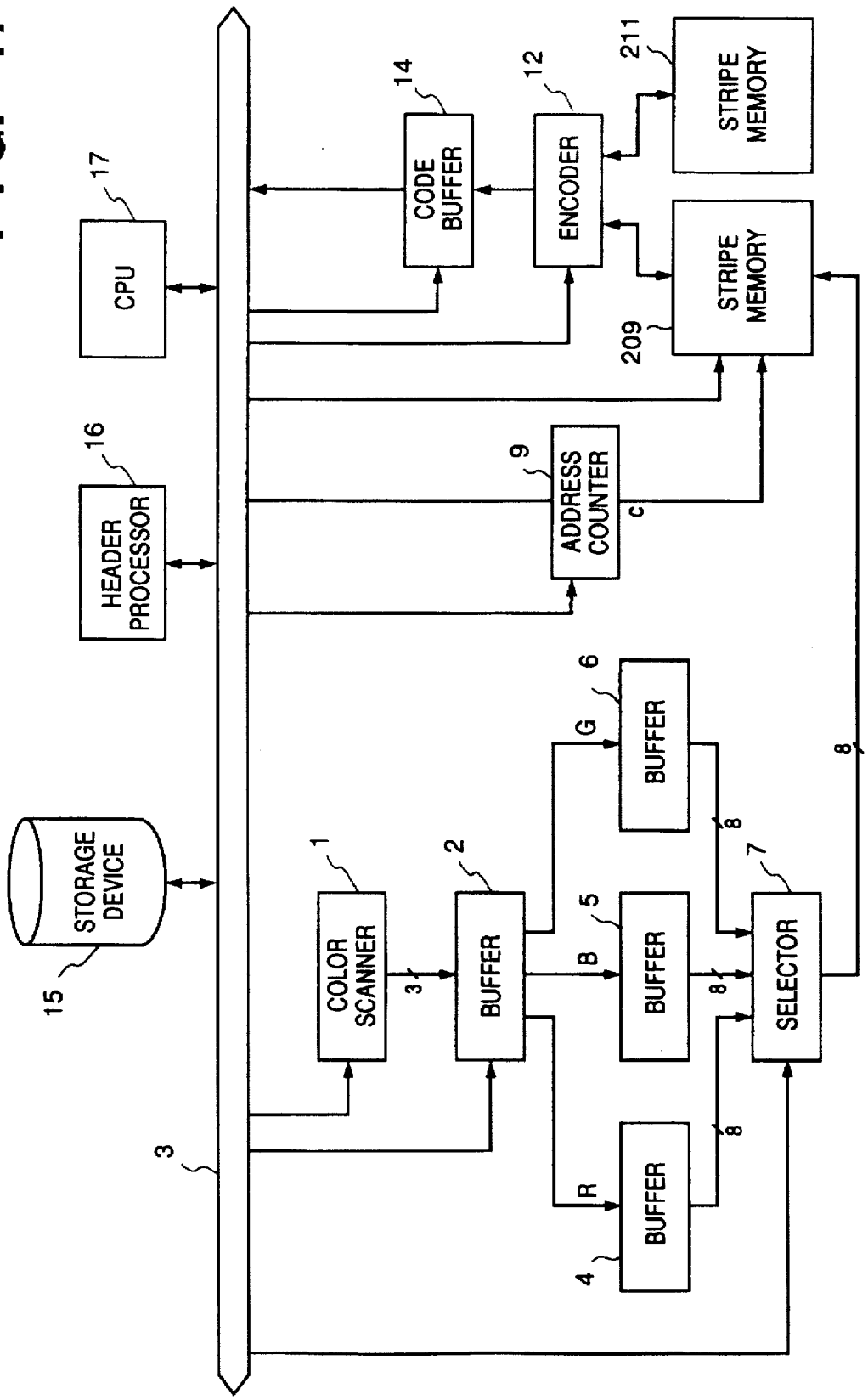
FIG. 17 is a block diagram showing the construction of an image encoding apparatus according to a third embodiment of the present invention.
Figure 18:
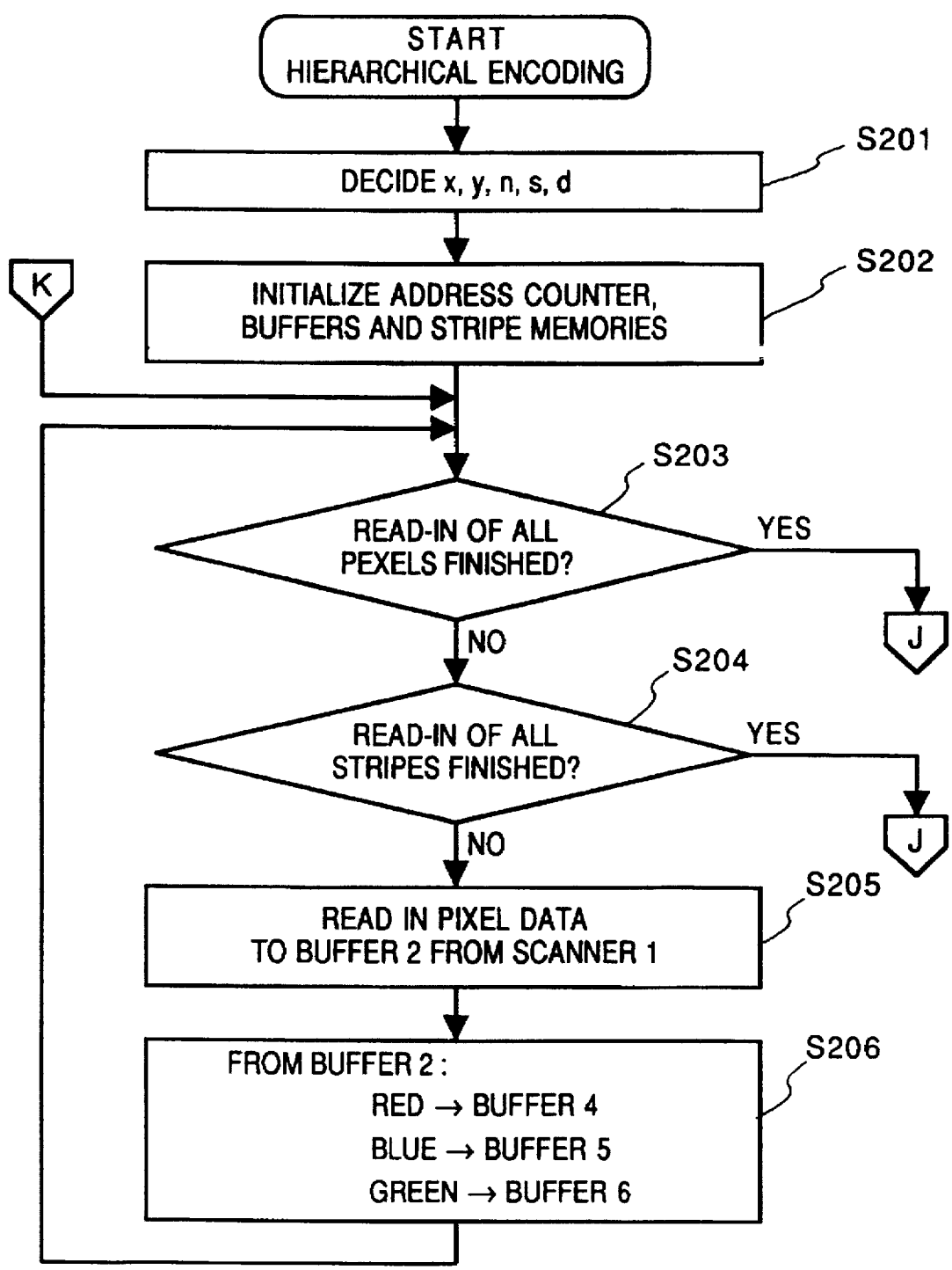
FIGS. 18 through 22 are flowcharts illustrating a hierarchical encoding procedure according to the third embodiment.
Figure 19:
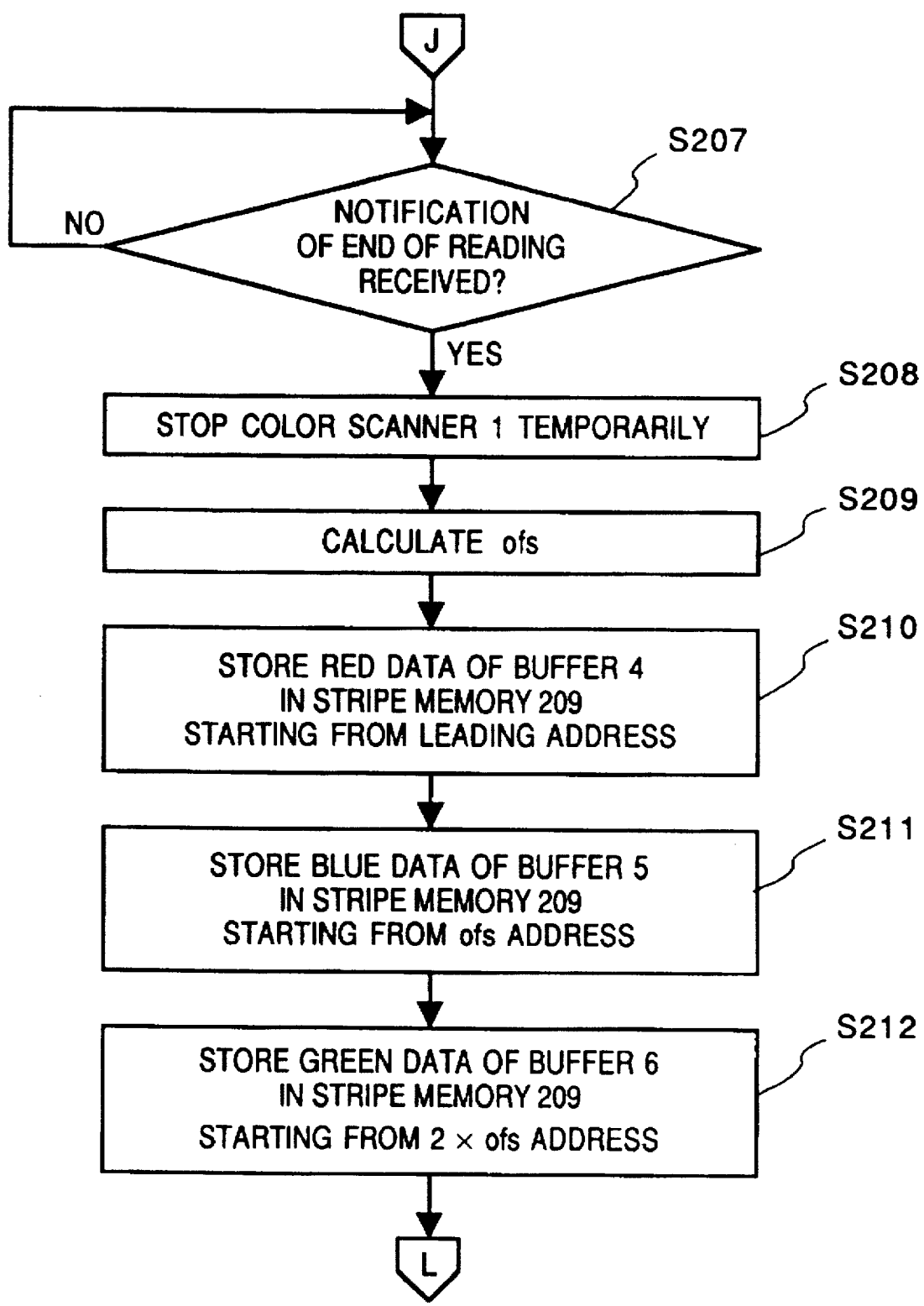
Figure 20:
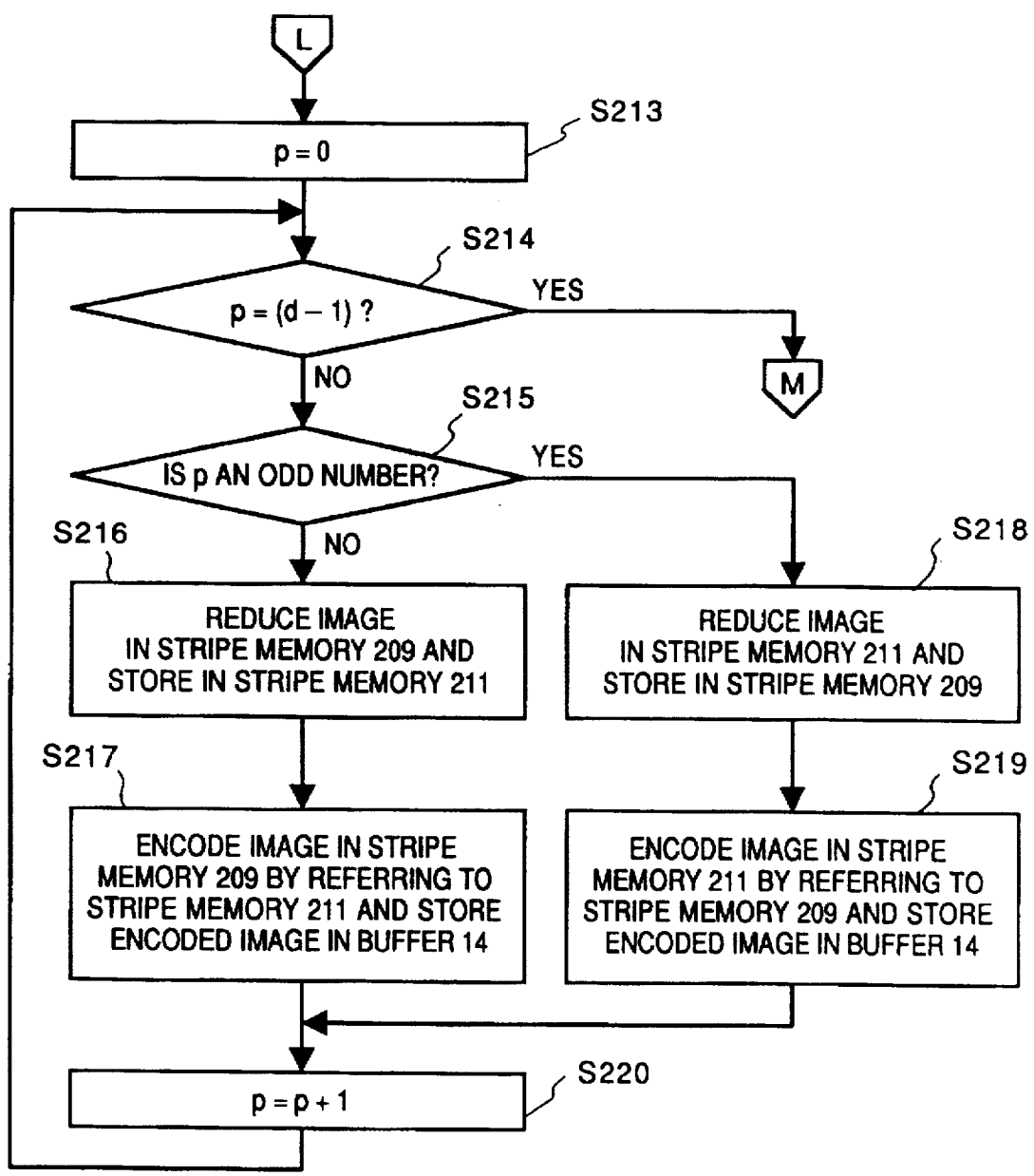
Figure 21:
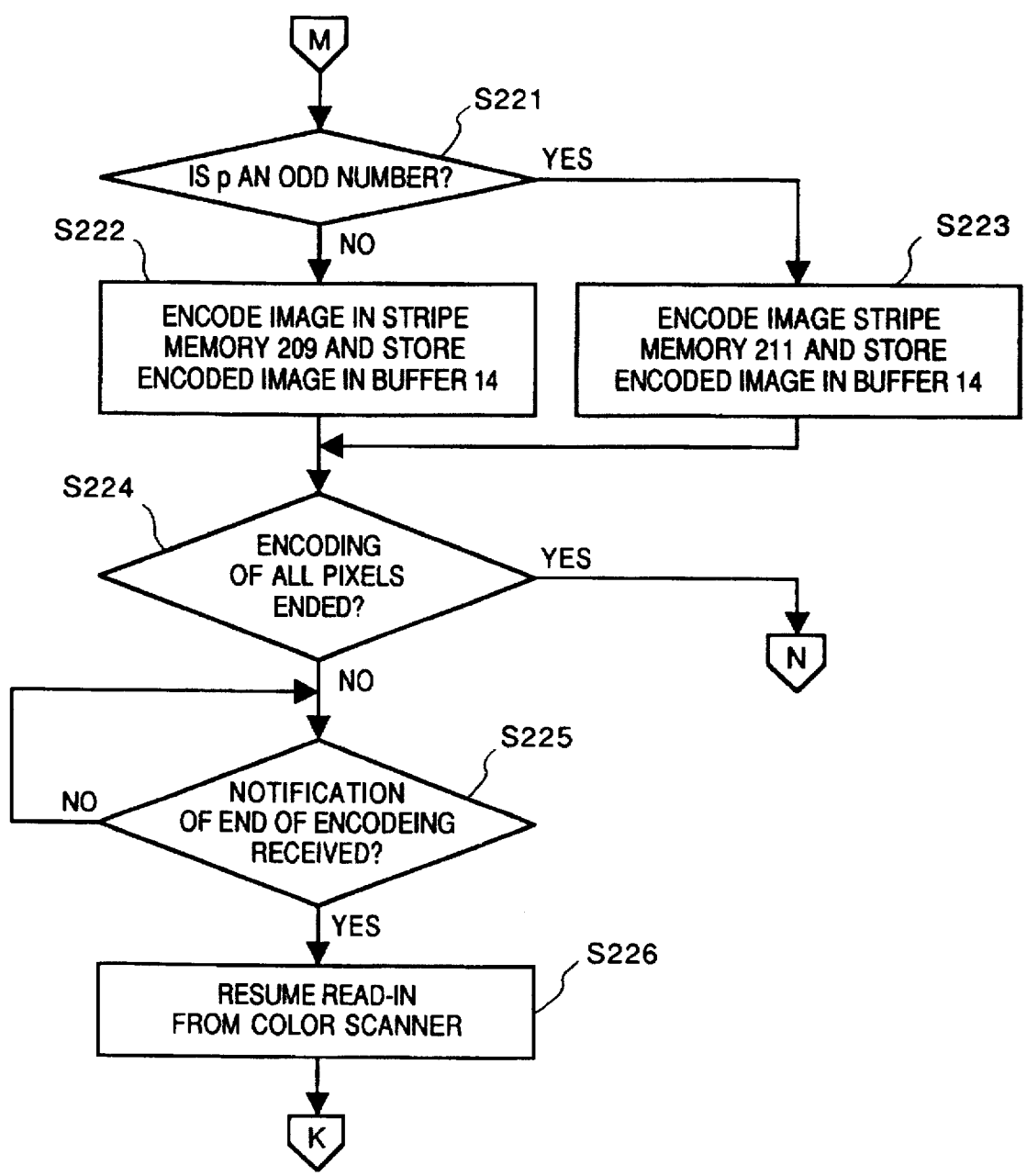
Figure 22:
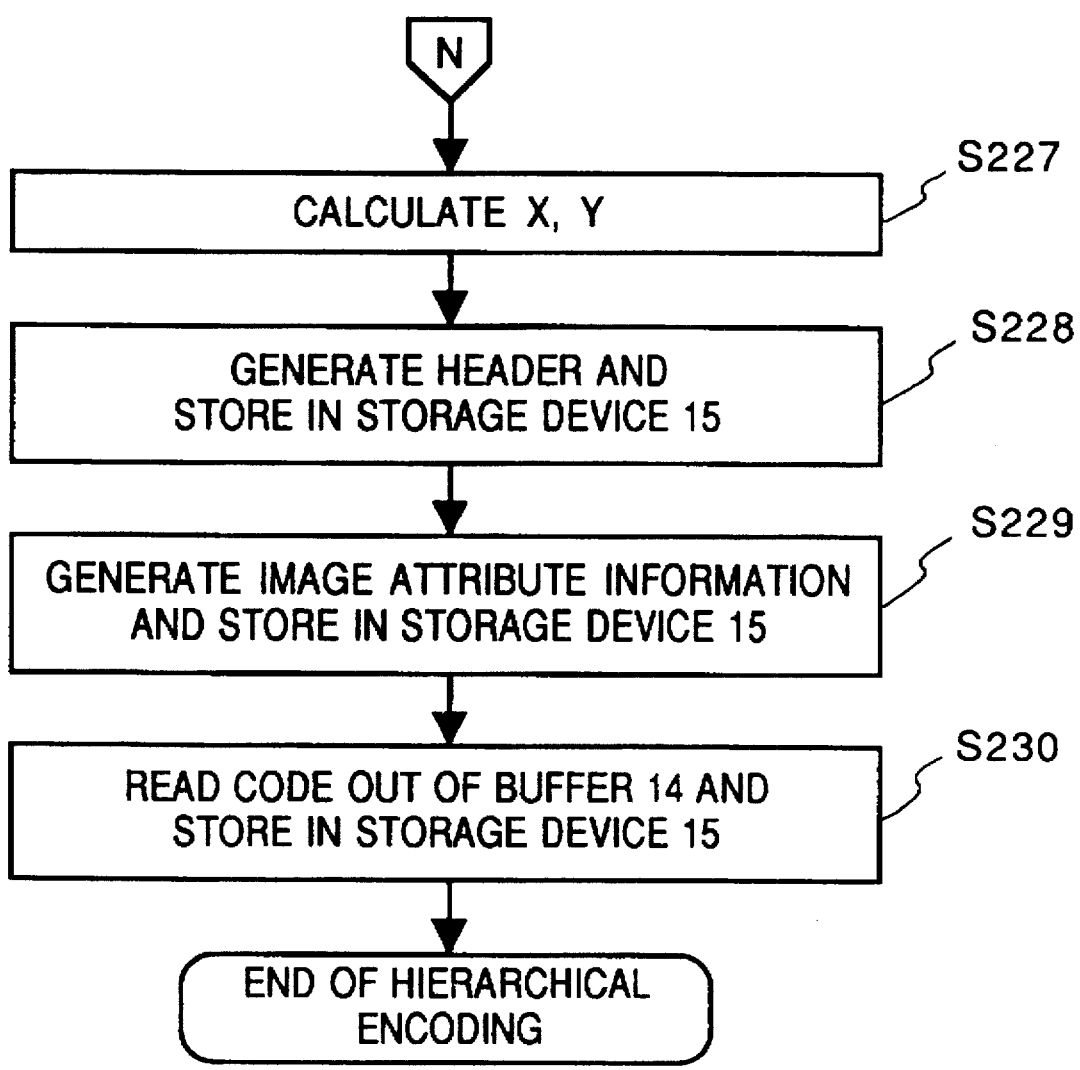

FIG. 17 is a block diagram showing the construction of an image encoding apparatus according to a third embodiment of the present invention.

The apparatus of FIG. 17 includes a stripe memory 209 in which stripes obtained by partitioning an original image to be encoded are stored in bit units, and a stripe memory 211 in which stripes of reduced images generated at the time of hierarchical encoding are stored in bit units. Hierarchical encoding of a binary image according to the JBIG method will now be described as an example. Though the minimum size of an image is made the 2nd layer and the number of stripes of the 0th layer is made 128, this does not place a limitation upon the invention.

FIGS. 18 through 22 are flowcharts illustrating the procedure of hierarchical encoding according to this embodiment. The processing of these flowcharts is executed by the CPU 17.

The image size (x,y) of the image to be encoded, the bit depth n, the stripe width s and the number d of layers are decided at step S201 and the color scanner 1 is notified. As in the first embodiment, let x=3,072, y=4,090, n=3, s=128 and d=3 hold in the following description.

Next, at step S202, the address counter 9, the buffers 2, 4, 5, 6, 14 and the stripe memories 209, 211 are initialized. That is, the count c of the address counter 9 is made zero and the buffers and stripe memories are cleared.

The program then proceeds to step S205 via steps S203 and S204. At step S205, the color scanner 1 is caused to read the image of the original and pixel data of three bits per pixel is stored successively in the buffer 2. The image data that has been stored in the buffer 2 is read out upon being separated according to color at step S206, and the read data is stored in the buffers 4, 5, 6. More specifically, the red bit of the pixel data is stored at an i-th bit of the buffer 4 in dependence upon the loop variable i of the loop counter 8. Similarly, the blue bit is stored at the i-th bit of buffer 5 and the green bit is stored at the i-th bit of buffer 6. It is determined at step S203 whether the reading in of all pixels has ended, and it is determined at step S204 whether the reading in of one stripe has ended. The procedure composed of the series of steps S203 to S206 is repeated until a "YES" decision is rendered at either step S203 or S204.

When notification of the fact that the reading in of one stripe has ended is received from the color scanner 1 at step S207, the color scanner 1 is stopped temporarily at step S208 and the offset value ofs is obtained in accordance with the following equation at step S209. In this embodiment, it is assumened that the offset value ofs are 393 and 216.

$$ofs = s \times x \tag{5}$$

Next, at step S210, the selector 7 is made to select the buffer 4 and the data of the color red is stored in the stripe memory 209 from the starting address thereof. The selector 7 is then made to select the buffer 5 at step S211 to store the data of the color blue in the stripe memory 209 from the ofs address thereof, and to select the buffer 6 at step S212 to store the data of the color green in the stripe memory 209 from the 2ofs address thereof.

A layer loop variable p is then made zero at step S213 and the variable p is compared with the number d of layers at step S214. The program proceeds from step S214 to step S215 if p<(d−1) holds and to step S221 if p=(d−1) holds.

If p<(d−1) holds, then it is determined at step S215 whether the layer loop variable p is an odd number. Since the initial value of the layer loop variable p is zero (an even number), then the program proceeds to step S216, where the encoder 12 generates the 1st-layer image from the image that has been stored in the stripe memory 209 and plants this image in the stripe memory 211. This is followed by step S217, at which the encoder 12 encodes the 0th-layer image, which has been stored in the stripe memory 209, by referring to the 1st-layer image in the stripe memory 211, and stores the generated code in the code buffer 14 in order from the beginning thereof.

The layer loop variable p is incremented at step S220, after which the program returns to step S214. Accordingly, now the program proceeds from step S214 to step S218 via step S215 because the layer loop variable p is 1 [i.e., p<(d−1) holds] and an odd number as well. At step S218, the encoder 12 generates the 2nd-layer image from the 1st-layer image that has been stored in the stripe memory 211 and plants this image in the stripe memory 209. This is followed by step S219, at which the encoder 12 encodes the 1st-layer image, which has been stored in the stripe memory 211, by referring to the 2nd-layer image in the stripe memory 209, and stores the generated code in the code buffer 14 following the stored code of the 0th-layer image.

The layer loop variable p is incremented at step S220, after which the program returns to step S214. Accordingly, now the program proceeds from step S214 to step S222 via step S221 because the layer loop variable p is 2 [i.e., p=(d−1) holds] and an even number as well. At step S222, the encoder 12 encodes the 2nd-layer image, which has been stored in the stripe memory 214, and stores the generated code in the code buffer 14 following the stored code of the 1st-layer image. In a case where the layer loop variable p is found to be an odd number at step S221, the program proceeds to step S223, at which the encoder 12 encodes the nth-layer image, which has been stored in the stripe memory 211, and stores the generated code in the code buffer 14 following the stored code of the (n−1)th-layer image.

Next, it is determined at step S224 whether the encoding of all pixels has ended. If encoding is not finished, then the program proceeds to step S225. Here, if notification of end of encoding is received from the encoder 12, reading in of the image by the color scanner 1 is resumed at step S226 and the program returns to step S203. The next stripe is read in by the procedure composed of the series of steps from S203 to S206.

When reading in of all pixels is found to have ended at step S203, the offset value ofs is obtained at step S209 in accordance with the following equation. In this embodiment, it is assumed that the offset value ofs are 374 and 784.

$$ofs=(y \% s) \times x \qquad (6)$$

where "%" represents an arithmetic operation for obtaining a remainder.

When the encoding of all pixels is found to have ended at step S224, the program proceeds to step S227, at which the image size of the original image is corrected to X, Y obtained in accordance with the following equations:

$$X=x \qquad (7)$$

$$Y=y' \times n \qquad (8)$$

Next, at step S228, the header processor 16 is started in order to generate a header from the aforementioned X, Y, s, d and the encoded data order (HIGH-TO-LOW: high-resolution data is at the beginning) and store the header in a prescribed area of the storage device 15. Next, at step S229, data representing bit depth n of the original image and the type of image (a color image in this case) is stored, as image attribute information, following the header stored in the storage device 15 by the header processor 16. Then, at step S230, all of the code that has been stored in the code buffer 14 is stored in the storage device 15 following the image attribute information. Hierarchical encoding is then terminated.

FIG. 23 is a diagram illustrating the format of the image attribute information. The attribute information is composed of eight bits. The two most significant bits represent the type of image data, the next three bits represent the way in which the data is arrayed, and the three remaining least significant bits represent the bit depth.

Thus, in accordance with the embodiment, effects similar to those of the first and second embodiments can be expected.

Though the foregoing embodiments have been described taking the JBIG method as an example of an encoding method, this does not impose a restriction upon the present invention and other methods of generating and encoding layer images may be used. For example, it is permissible to use a combination of layer-image generation by subsampling and MMR encoding or block encoding.

Further, the input image is not limited to that described above. For example, the input image may be a 24-bit full-color image or a two-color image of the type in which red characters are superimposed upon a monochromatic image. Similarly, the order of codes, the number of layers, image size and the memory configuration for encoding are not limited to those mentioned above.

Furthermore, there is no limitation upon the form of the image attribute information. For example, the storage device and its storage areas may be managed upon being separated, whereby the color image may be distinguished from the monochromatic (grayscale) image.

In addition, utilization of the codes generated is not limited solely to storage in the storage device. For example, these codes can be utilized in image communication via a communication interface.

As many apparently widely different embodiments of the present invention can be made without departing from the spirit and scope thereof, it is to be understood that the invention is not limited to the specific embodiments thereof except as defined in the appended claims.

What is claimed is:

1. An image encoding apparatus for encoding image data representing an image which consists of a plurality of pixels, each of pixels being represented by at least two bits of pixel data, comprising:

partitioning means for partitioning the image data to be encoded into a plurality of bit planes of pixel data;

constructing means for constructing one unit of image data by joining the plurality of bit planes of pixel data partitioned by said partitioning means, wherein a bit order in the one unit is different from a bit order in the plurality of bit planes;

generating means for generating reduced image data representing at least one reduced image layer by reducing the one unit; and encoding means for encoding the reduced image data generated by said generating means, and for encoding the one unit such that at least some bits from one of the bit planes are encoded together with bits from at least one other of the bit planes.

2. The apparatus according to claim 1, wherein said encoding means hierarchically encodes the reduced image data and the one unit of image data.

3. The apparatus according to claim 1, wherein the image data to be encoded is color image data.

4. The apparatus according to claim 3, wherein the color image data is binary color image data which includes a plurality of bit planes of pixel data corresponding to a plurality of primary colors, respectively.

5. The apparatus according to claim 1, wherein said constructing means constructs the one unit of image data by serially connecting the plurality of bit planes of pixel data.

6. The apparatus according to claim 1, wherein said encoding means encodes the reduced image data and the one unit of image data in accordance with the JBIG method.

7. The apparatus according to claim 1, further comprising add-on means for adding-on attribute information of the image data to be encoded to code data outputted by said encoding means.

8. The apparatus according to claim 7, wherein the attribute information represents a number of bit planes of the pixel data.

9. The apparatus according to claim 7, wherein the attribute information represents a type of the image represented by the image data.

10. The apparatus according to claim 9, wherein the attribute information represents whether the image is a monochromatic image, a grayscale image or a color image.

11. The apparatus according to claim 9, wherein the attribute information represents whether the image is an RGB (Red, Green, Blue) color image, a YMC (Yellow, Magenta, Cyan) color image or a YMCK (Yellow, Magenta, Cyan, Black) color image.

12. An image encoding apparatus for encoding color image data representing a color image which consists of a plurality of pixels, each of the pixels being represented by a plurality of bits of pixel data corresponding to a plurality of primary colors, respectively, comprising:

partitioning means for partitioning the color image data to be encoded into a plurality of bit planes of pixel data corresponding to a plurality of primary colors, respectively;

constructing means for constructing one unit of image data by joining the plurality of bit planes of pixel data corresponding to a plurality of primary colors, respectively, partitioned by said partitioning means, wherein a bit order in the one unit is different from a bit order in the plurality of bit planes;

generating means for generating reduced image data representing at least one reduced image layer by reducing the one unit; and encoding means for encoding the reduced image data generated by said generating means, and for encoding the one unit such that at least some bits from one of the bit planes are encoded together with bits from at least one other of the bit planes.

13. The apparatus according to claim 12, wherein said encoding means hierarchically encodes the reduced image data and the one unit of image data.

14. The apparatus according to claim 12, wherein the color image data is binary color image data which includes a plurality of bit planes of pixel data corresponding to a plurality or primary colors, respectively.

15. The apparatus according to claim 12, wherein said constructing means constructs the one unit of image data by serially connecting the plurality of bit planes of pixel data corresponding to a plurality of primary colors, respectively.

16. The apparatus according to claim 12, wherein said encoding means encodes the reduced image data and the one unit of image data in accordance with the JBIG method.

17. The apparatus according to claim 12, further comprising add-on means for adding-on attribute information of the color image data to be encoded to code data outputted by said encoding means.

18. The apparatus according to claim 17, wherein the attribute information includes bit depth of the color image data.

19. The apparatus according to claim 17, wherein the attribute information represents the type of the color image represented by the color image data.

20. The apparatus according to claim 19, wherein the attribute information represents whether the color image is an RGB (Red, Green, Blue) color image, a YMC (Yellow, Magenta, Cyan) color image or a YMCK (Yellow, Magenta, Cyan, Black) color image.

21. An image encoding method of encoding image data representing an image which consists of a plurality of pixels, each of pixels being represented by at least two bits of pixel data, comprising:

a partitioning step of partitioning the image data to be encoded into a plurality of bit planes of pixel data;

a constructing step of constructing one unit of image data by joining the plurality of bit planes of pixel data partitioned at said partitioning step;

a generating step of generating reduced image data representing at least one layer of reduced image by reducing the one unit; and an encoding step of encoding the reduced image data generated at said generating step and for encoding the one unit such that at least some bits from one of the bit planes are encoded together with bits from at least one other of the bit planes.

22. The method according to claim 21, wherein the reduced image data and the one unit of image data are hierarchically encoded at said encoding step.

23. The method according to claim 21, further comprising an add-on step of adding-on attribute information of the image data to be encoded to data outputted at said encoding step.

24. An encoding method of encoding color image data representing a color image which consists of a plurality of pixels, each of the pixels being represented by a plurality of bits of pixel data corresponding to a plurality of primary colors, respectively, comprising:

a partitioning step of partitioning the color image data to be encoded into a plurality of bit planes of pixel data corresponding to a plurality of primary colors, respectively;

a constructing step of constructing one unit of image data by joining the plurality of bit planes of pixel data corresponding to a plurality of primary colors, respectively, partitioned at said partitioning step, wherein a bit order in the one unit is different from a bit order in the plurality of bit planes;

a generating step of generating reduced image data representing at least one layer of reduced image by reducing the one unit; and an encoding step of encoding the reduced image data generated at said generating steps and of encoding the one unit such that at least some bits from one of the bit planes are encoded together with bits from at least one other of the bit planes.

25. The method according to claim 24, wherein the reduced image data and the one unit of image data are hierarchically encoded at said encoding step.

26. The method according to claim 24, further comprising an add-on step of adding-on attribute information of the color image data to code data outputted at said encoding step.

* * * * *